US007321637B2

(12) United States Patent
Kuzumoto

(10) Patent No.: US 7,321,637 B2
(45) Date of Patent: Jan. 22, 2008

(54) DATA SLICE CONTROL DEVICE AND CONTROL METHOD

(75) Inventor: Keiichi Kuzumoto, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 543 days.

(21) Appl. No.: 11/041,215

(22) Filed: Jan. 25, 2005

(65) Prior Publication Data

US 2005/0162298 A1 Jul. 28, 2005

(30) Foreign Application Priority Data

Jan. 27, 2004 (JP) ............................... 2004-18786

(51) Int. Cl.
*H04L 25/06* (2006.01)
*H04L 25/10* (2006.01)

(52) U.S. Cl. .................................... 375/317
(58) Field of Classification Search ................. 375/317
See application file for complete search history.

(56) References Cited

U.S. PATENT DOCUMENTS 5,138,451 A * 8/1992 Shinkawa et al. .......... 348/524

2003/0206559 A1 * 11/2003 Trachewsky et al. ....... 370/509
2004/0041944 A1 3/2004 Matsumoto

* cited by examiner

*Primary Examiner*—David C. Payne
*Assistant Examiner*—Nader Bolourchi
(74) *Attorney, Agent, or Firm*—Wenderoth, Lind & Ponack, L.L.P.

(57) ABSTRACT

A data slice control device comprises a monotone increase detection circuit for detecting a monotone increase point of a data signal, a monotone decrease detection circuit for detecting a monotone decrease point of the data signal, a counter for calculating a monotone increase interval value from the monotone increase point to a next monotone increase point, a data holding circuit for calculating a monotone increase monotone decrease interval value from the monotone increase point to the monotone decrease point, a CRI period determination circuit for determining whether the data signal is within a CRI period or not on the basis of the monotone increase interval value and the monotone increase monotone decrease interval value, and a slice level calculation circuit for calculating a slice level from a maximum value and a minimum value of amplitude values of the data signal only when the data signal is within the CRI period.

16 Claims, 15 Drawing Sheets

Fig.15

| region | type | superimposition line | transmission clock |
|---|---|---|---|
| Europe | teletext | 7~22 | 6.9375MHz |
| | VPS | 16 | 5MHz |
| | WSS | 23 | 5MHz |
| Japan | multiplex telecast | 14, 15, 17, 21, 277,278,279,284 | 5.7272MHz |
| U.S.A | closed caption | 21 | 503kHz |

DATA SLICE CONTROL DEVICE AND CONTROL METHOD

FIELD OF THE INVENTION

The present invention relates to a device and a method for controlling a slice level of data which are serially transmitted and, more particularly, to those for controlling a slice level of text data of telecast which are transmitted utilizing a vertical blanking period of a video signal.

BACKGROUND OF THE INVENTION

Conventionally, a telecast mode for transmitting data of telecast utilizing a vertical blanking period of a video signal has generally been known as a method for transmitting data using serial transmission. In various regions throughout the world, data of telecasts are transmitted utilizing vertical blanking periods of video signals. FIG. 15 shows the types of telecasts employed in the respective regions in the world, superimposition lines where telecasts are superimposed, and transmission clocks. In order to calculate slice levels of telecast data of these telecasts, a data slice control device as shown in FIG. 14 has conventionally been employed (refer to "Description of MN102H51K/F51K/57K/F57K LSI, Chapter 9: Caption Decoder, P295-332, [online], May, 2000, Matsushita Electric Industrial Co., Ltd. Semiconductor Company [searched on Jun. 9, 2003], the Internet <URL: https://www.semicon.panasonic.co.jp/cgi-bin/micom/manual/download/
dwld_products.cgi?email=general&passwd=generaluser&mode=general&lang=3&type=0&series=MN102H00>).
Hereinafter, the construction and operation of the conventional data slice control device will be described with reference to FIG. 14.

In FIG. 14, a video signal input terminal 1401 receives an analog video signal S1401 in which telecast data are superimposed in a vertical blanking period.

An A/D converter 1402 samples the analog video signal S1401 with a predetermined sampling clock fs (MHz) to convert the analog video signal S1401 into a digital video signal S1402, and outputs the digital video signal S1402 to a low-pass filter (LPF) 1403.

The LPF 1403 subjects the inputted digital video signal S1402 to noise removal, and outputs the noise-removed digital video signal S1403 to a maximum value detection circuit 1404, a minimum value detection circuit 1405, and a binarization circuit 1414.

A sync separation circuit 1419 separates the inputted digital video signal S1402 into a horizontal sync signal S1419a and a vertical sync signal S1419b, and outputs these signals to a clock run-in (CRI) period setting circuit 1418. The horizontal sync signal S1419a and the vertical sync signal S1419b are used for setting the position of a CRI period.

The CRI period setting circuit 1418 generates a CRI period setting signal S1418 for setting a CRI period of the telecast data superimposed on the digital video signal S1402, on the basis of the vertical sync signal S1419b and the horizontal sync signal S1419a, and outputs the CRI period setting signal S1418 to the maximum value detection circuit 1404 and the minimum value detection circuit 1405.

The maximum value detection circuit 1404 detects a maximum value S1404 of the amplitudes at the sampling points of the digital data within the period that is set by the CRI period setting signal, on the basis of the CRI period setting signal S1418 obtained from the CRI period setting circuit 1418 and the noise-removed digital video signal S1403, and outputs the maximum value S1404 to a slice level calculation circuit 1413.

The minimum value detection circuit 1405 detects a minimum value S1405 of the amplitudes at the sampling points of the digital data within the period that is set by the CRI period setting signal, on the basis of the CRI period setting signal S1418 obtained from the CRI period setting circuit 1418 and the noise-removed digital video signal S1403, and outputs the minimum value S1405 to the slice level calculation circuit 1413.

The slice level calculation circuit 1413 calculates a slice level S1413 using the maximum value S1404 and the minimum value S1405, and outputs the slice level S1413 to the binarization circuit 1414.

The binarization circuit 1414 converts the noise-removed digital video signal S1403 into a binarized signal S1414 comprising 0 and 1 at the slice level S1413, and outputs the binarized signal S1414 to a sampling circuit 1415.

The sampling circuit 1415 samples the binarized signal S1414 that is obtained in the binarization circuit 1414, at predetermined sampling intervals according to the type of the telecast mode, and outputs sampled data S1415 to a decoding circuit 1416.

The decoding circuit 1416 converts the serial sampled data S1415 into a parallel signal, subjects the parallel signal to a decoding process according to the telecast type, such as error correction, and outputs the decoded data S1416 through an output terminal 1417 to the outside.

In the conventional data control device shown in FIG. 14, however, the CPI period setting signal is generated on the basis of the horizontal sync signal obtained from the sync separation circuit, and a maximum value and a minimum value of the amplitudes of the data within the period indicated by the CRI period setting signal are calculated, and then the slice level of the telecast data is calculated using the maximum value and the minimum value. Therefore, the following drawbacks may occur.

That is, there are cases where the horizontal sync signal separated by the sync separation circuit may be disturbed by such as a macrovision signal of a copy guard signal that is superimposed in the vertical blanking period. Then, the CRI period setting signal is also disturbed, whereby the CRI period setting signal cannot be generated in a desired position, and an optimum slice level cannot be calculated.

SUMMARY OF THE INVENTION

The present invention is made to solve the above-described problems and has for its object to provide data slice control device and method which are able to calculate an accurate slice level even when the horizontal sync signal and the CRI period setting signal are disturbed by a macrovision signal or the like.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a data slice control device comprises: an A/D converter for sampling a data signal transmitted in serial, with a sampling clock of a predetermined frequency, thereby converting the data signal into digital data; a period setting circuit for setting a predetermined period of the data signal; a monotone increase detection circuit for detecting a monotone increase detection point indicating that amplitude values of sampling points of the digital data continuously increase within the period that is set by the period setting circuit; a monotone decrease detection circuit for detecting a monotone decrease detection point indicating that amplitude values of sampling points of the digital data continuously decrease within the period that is set by the period setting circuit; a counter for performing counting with the sampling clock during the period that is set by the period setting circuit, while resetting the count at a timing when the monotone increase detection circuit detects the monotone increase detection point; a data holding circuit for holding count data obtained from the counter, at a timing when the monotone decrease detection circuit detects a monotone decrease detection point; a period determination circuit for determining whether the data signal is within the predetermined period or not, on the basis of the monotone increase detection point obtained from the monotone increase detection circuit, the count data obtained from the counter, and the data held by the data holding circuit; a maximum value detection circuit for detecting a maximum value of the amplitude values of the digital data within the period during which the monotone increase detection circuit detects the monotone increase points; a minimum value detection circuit for detecting a minimum value of the amplitude values of the digital data within the period during which the monotone increase detection circuit detects the monotone increase points; and a slice level calculation circuit for calculating a slice level on the basis of the maximum value obtained from the maximum value detection circuit, the minimum value obtained from the minimum value detection circuit, and a result of determination obtained from the period determination circuit. Therefore, even when the horizontal sync signal is disturbed by a macrovision signal or the like, a slice level can be detected only in the slice level detection range with data outside the detection range being ignored. As a result, a correct and precise slice level can be calculated.

According to a second aspect of the present invention, a data slice control device according to the first aspect further comprises: a determination result counter for counting the result of determination obtained from the period determination circuit; an accumulation circuit for accumulating the slice levels obtained from the slice level calculation circuit; and a data selection circuit for selecting a slice level on the basis of the accumulated data obtained from the accumulation circuit, and the determination result count data obtained from the determination result counter. Therefore, even when the data signal is disturbed due to ghosts or noises during a predetermined period (CRI period or framing code period), slice levels can be calculated in a predetermined period including the same frequency component, and the average of the slice levels can be obtained. As a result, a more accurate slice level can be calculated while reducing adverse effects of ghosts and noises.

According to a third aspect of the present invention, in the data slice control device according to the first aspect, the data signal transmitted in serial is a telecast signal that is superimposed in a vertical blanking period of a video signal and transferred.

According to a fourth aspect of the present invention, in the data slice control device according to the first aspect, the period setting circuit sets a transmission clock synchronization period in which the transmission clock of the data signal is synchronized with the sampling clock.

According to a fifth aspect of the present invention, a data slice control device comprises: an A/D converter for sampling a data signal transmitted in serial, with a sampling clock of a predetermined frequency, thereby converting the data signal into digital data; a period setting circuit for setting a predetermined period of the data signal; a coring circuit for subjecting the digital data to a coring process; a first masking circuit for subjecting coring data, which is obtained from the coring circuit within the period set by the period setting circuit, to a masking process; a first delay unit for delaying the masking-processed coring data obtained from the first masking circuit, by one sampling clock; a second delay unit for delaying the delayed data obtained from the first delay unit, by another one sampling clock; an operation unit for arithmetically processing the masking-processed coring data obtained from the first masking circuit, and the delayed data obtained from the second delay unit; a shifting operation circuit for subjecting operation result data obtained from the operation unit to a shift operation process; a determination unit for detecting a point indicating that amplitude values of sampling points of the digital data continuously increase and a point indicating that amplitude values of sampling points of the digital data continuously decrease, on the basis of the masking-processed coring data obtained from the first masking circuit, and the delayed data obtained from the second delay unit, and outputting a monotone increase point detection signal and a monotone decrease point detection signal, respectively; a comparator for comparing the delayed data obtained from the first delay unit with the shifting operation result data obtained from the shifting operation unit; a second masking circuit for subjecting the monotone increase point detection signal obtained from the determination unit to a masking process on the basis of a result of comparison obtained from the comparator; a third masking circuit for subjecting the monotone decrease point detection signal obtained from the determination unit to a masking process on the basis of the result of comparison obtained from the comparator; a counter for performing counting with the sampling clock during the period that is set by the period setting circuit, while resetting the count at a timing when the second masking circuit outputs a monotone increase detection signal; a data holding circuit for holding count data outputted from the counter, at the timing when the third masking circuit outputs a monotone decrease detection signal; a period determination circuit for determining whether the data signal is within the predetermined period or not, on the basis of the monotone increase detection signal obtained from the second masking circuit, the count data obtained from the counter, and the data held by the data holding circuit; a maximum value detection circuit for detecting a maximum value of the amplitude values of the digital data within the period during which the monotone increase points indicated by the monotone increase detection signal obtained from the second masking circuit are detected; a minimum value detection circuit for detecting a minimum value of the amplitude values of the digital data within the period during which the monotone decrease points indicated by the monotone decrease detection signal obtained from the third masking circuit are detected; and a slice level calculation circuit for calculating a slice level on the basis of the maximum value obtained from the maximum value detection circuit, the minimum value obtained from the minimum value detection circuit, and a result of determination obtained from the period determination circuit. Therefore, even when the horizontal sync signal is disturbed by a macrovision signal or the like, a slice level can be detected only in the slice level detection range with data outside the detection range being ignored. Further, since the inclinations of monotone increase and monotone decrease of the digital data are calculated using the determination unit and the comparator, more accurate detection of monotone increase and decrease can be carried out. Furthermore, since the digital data is subjected to coring, adverse effects of noises equal to or lower than the pedestal level can be reduced. As a result, a more accurate slice level can be calculated.

According to a sixth aspect of the present invention, the data slice control device according to the sixth aspect further comprises: a determination result counter for counting the result of determination obtained from the period determination circuit; an accumulation circuit for accumulating the slice levels obtained from the slice level calculation circuit; and a data selection circuit for selecting a slice level on the basis of the accumulated data obtained from the accumulation circuit, and the determination result count data obtained from the determination result counter. Therefore, even when the data signal is disturbed due to ghosts or noises during a predetermined period (CRI period or framing code period), slice levels can be calculated in a predetermined period including the same frequency component, and the average of the slice levels can be obtained. As a result, adverse effects of ghosts and noises can be reduced. Furthermore, since the digital data is subjected to coring, adverse effects of noises equal to or lower than the pedestal level can be reduced. As a result, a more accurate slice level can be calculated.

According to a seventh aspect of the present invention, in the data slice control device according to the fifth aspect, the data signal transmitted in serial is a telecast signal that is superimposed in a vertical blanking period of a video signal, and transmitted.

According to an eighth aspect of the present invention, in the data slice control device according to the fifth aspect, the period setting circuit sets a transmission clock synchronization period in which the transmission clock of the data signal is synchronized with the sampling clock.

According to a ninth aspect of the present invention, a data slice control method comprises: an A/D conversion step of sampling a data signal transmitted in serial, with a sampling clock of a predetermined frequency, thereby converting the data signal into digital data; a period setting step of setting a predetermined period of the data signal; a data storage step of storing the digital data within the period that is set in the period setting step; an address generation step of generating storage addresses of the digital data that is stored in the data storage step; a maximum value detection step of detecting a maximum value of the amplitude values of the digital data stored in the data storage step; a minimum value detection step of detecting a minimum value of the amplitude values of the digital data stored in the data storage step; a monotone increase point address detection step of detecting a storage address of a monotone increase point indicating that the amplitude values of the sampling points of the digital data stored in the data storage step continuously increase; a monotone decrease point address detection step of detecting a storage address of a monotone decrease point indicating that the amplitude values of the sampling points of the digital data stored in the data storage step continuously decrease; a determination step of determining whether the digital data corresponding to the monotone increase point address is a monotone increase point or not, on the basis of the monotone increase point address detected in the monotone increase point detection step, a monotone increase point address that is detected by one sampling clock before the monotone increase point address, and the monotone decrease point address detected in the monotone decrease point detection step; and a slice level calculation step of calculating a slice level from the maximum value obtained in the maximum value detection step and the minimum value obtained in the minimum value detection step, on the basis of a result of determination obtained from the determination step. Therefore, even when the horizontal sync signal is disturbed by a macrovision signal or the like, a slice level can be detected only in the slice level detection range with data outside the detection range being ignored. As a result, a correct and precise slice level can be calculated.

According to a tenth aspect of the present invention, the data slice control method according to the ninth aspect further comprises: a determination result counting step of counting the result of determination obtained in the determination step; an accumulation step of accumulating the slice levels obtained in the slice level calculation step; and a slice level operation step of arithmetically processing the slice levels on the basis of the accumulated data obtained in the accumulation step, and the determination result count data obtained in the determination result counting step. Therefore, even when the data signal is disturbed due to ghosts or noises during a predetermined period (CRI period or framing code period), slice levels can be calculated in a predetermined period including the same frequency component, and the average of the slice levels can be obtained. As a result, a more accurate slice level can be calculated while reducing adverse effects of ghosts and noises.

According to an eleventh aspect of the present invention, in the data slice control method according to the ninth aspect, the data signal transmitted in serial is a telecast signal that is superimposed in a vertical blanking period of a video signal and transmitted.

According to a twelfth aspect of the present invention, in the data slice control method according to the ninth aspect, the period setting step is a step of setting a transmission clock synchronization period in which the transmission clock of the data signal is synchronized with the sampling clock.

According to a thirteenth aspect of the present invention, a data slice control method comprises: an A/D conversion step of sampling a data signal transmitted in serial, with a sampling clock of a predetermined frequency, thereby converting the data signal into digital data; a period setting step of setting a predetermined period of the data signal; a data storage step of storing the digital data within the period that is set in the period setting step; an address generation step of generating storage addresses of the digital data that is stored in the data storage step; a maximum value detection step of detecting a maximum value of the amplitude values of the digital data stored in the data storage step; a minimum value detection step of detecting a minimum value of the amplitude values of the digital data stored in the data storage step; a coring circuit of subjecting the digital data stored in the data storage step to a coring process; a comparison step of comparing the size of first data that is subjected to coring in the coring step, the size of second data that is subjected to coring by one sampling clock before the first data, and the size of third data that is subjected to coring by one sampling clock after the first data; a monotone increase point address storage step of storing the storage address of the first data as a monotone increase point address, when the result of comparison in the comparison step indicates that the data sizes of the first, second, and third data are in ascending order of the second data<the first data<the third data; a monotone decrease point address storage step of storing the storage address of the first data as a monotone decrease point address, when the result of comparison in the comparison step indicates that the data sizes of the first, second, and third data are in ascending order of the third data<the first data<the second data; a determination step of determining whether the digital data corresponding to the monotone increase point address is a monotone increase point or not, on the basis of the monotone increase point address stored in the monotone increase point address storage step, a monotone increase point address that is stored by one sampling clock before the monotone increase point address, and the monotone decrease point address stored in the monotone decrease point address storage step; and a slice level calculation step of calculating a slice level from the maximum value obtained in the maximum value detection step and the minimum value obtained in the minimum value detection step, on the basis of a result of determination obtained from the determination step. Therefore, even when the horizontal sync signal is disturbed by a macrovision signal or the like, a slice level can be detected only in the slice level detection range with data outside the detection range being ignored. Further, since the inclinations of monotone increase and monotone decrease of the digital data are calculated in the determination step and the comparison step, more accurate detection of monotone increase and decrease can be carried out. Furthermore, since the digital data is subjected to coring, adverse effects of noises equal to or lower than the pedestal level can be reduced. As a result, a more accurate slice level can be calculated.

According to a fourteenth aspect of the present invention, the data slice control method according to the thirteenth aspect further comprises: a determination result counting step of counting the result of determination obtained in the determination step; an accumulation step of accumulating the slice levels calculated in the slice level calculation step; and a slice level operation step of arithmetically processing the slice levels on the basis of the accumulated data obtained in the accumulation step, and the determination result count data obtained in the determination result counting step. Therefore, even when the data signal is disturbed due to ghosts or noises during a predetermined period (CRI period or framing code period), slice levels can be calculated in a predetermined period including the same frequency component, and the average of the slice levels can be obtained. As a result, a more accurate slice level can be calculated while reducing adverse effects of ghosts and noises. Furthermore, since the digital data is subjected to coring, adverse effects of noises equal to or lower than the pedestal level can be reduced. As a result, a more accurate slice level can be calculated.

According to a fifteenth aspect of the present invention, in the data slice control method according to the thirteenth aspect, the data signal transmitted in serial is a telecast signal that is superimposed in a vertical blanking period of a video signal and transmitted.

According to a sixteenth aspect of the present invention, in the data slice control method according to the thirteenth aspect, the period setting step is a step of setting a transmission clock synchronization period in which the transmission clock of the data signal is synchronized with the sampling clock.

BRIEF DESCRIPTION OF THE DRAWING

FIG. 15 is a table illustrating various types of telecasts for explaining the conventional data slice control device.

DETAILED DESCRIPTION OF THE PREFERRED EMBODIMENTS

Embodiment 1

Figure 1:
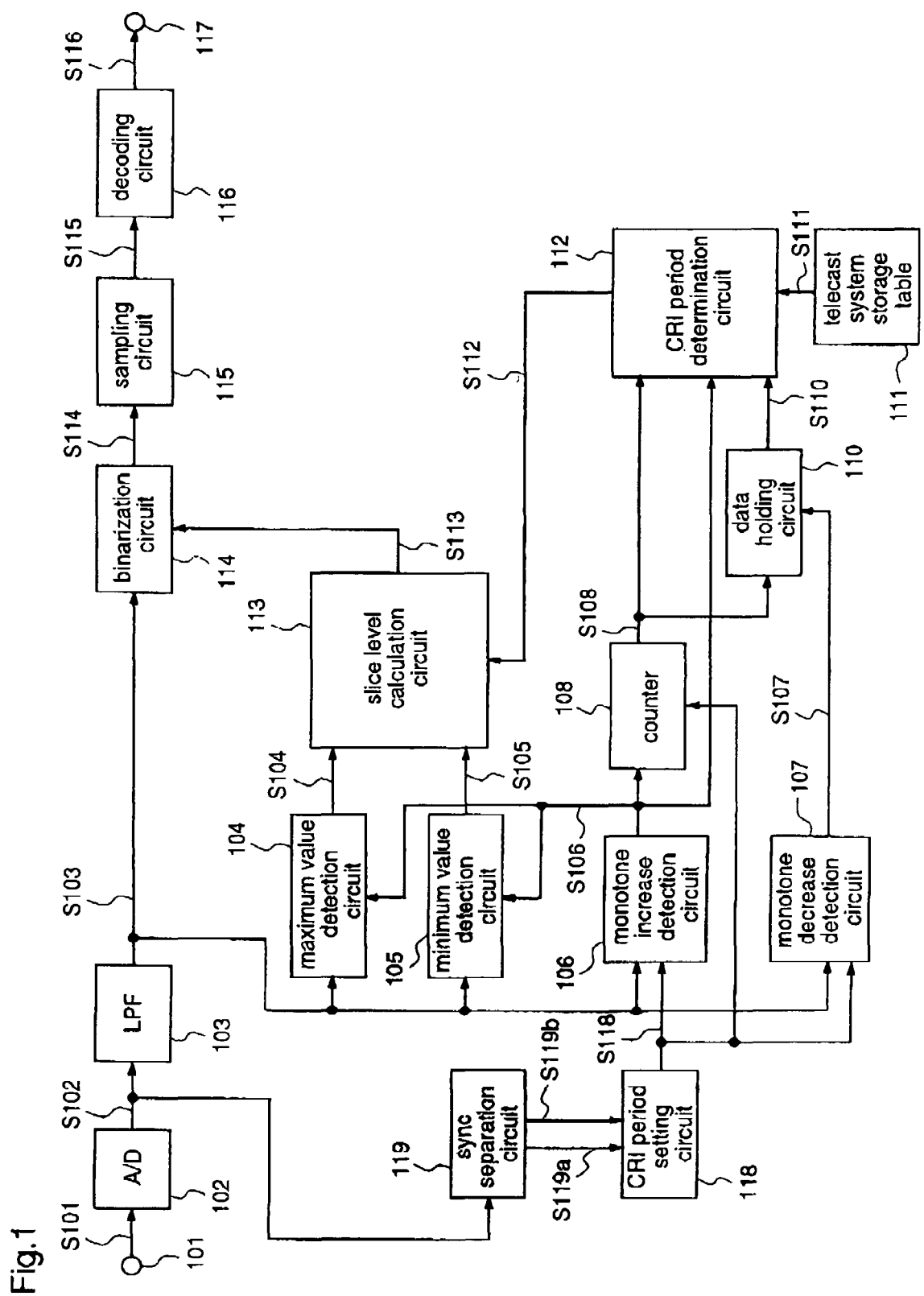
FIG. 1 is a block diagram illustrating the construction of a data slice control device according to a first embodiment of the present invention.

Hereinafter, a data slice control device according to a first embodiment of the present invention will be described with reference to FIGS. 1 and 2. FIG. 1 is a block diagram illustrating the construction of the data slice control device according to the first embodiment.

In FIG. 1, a video signal input terminal 101 receives an analog video signal S101 in which telecast data are superposed in a vertical blanking period.

An A/D converter 102 samples the analog video signal S101 with a predetermined sampling clock fs (MHz) to convert the analog video signal S101 into a digital video signal S102, and outputs the digital video signal S102 to a low-pass filter (LPF) 103.

The LPF 103 subjects the inputted digital video signal S102 to noise removal, and outputs the noise-removed digital video signal S103 to a maximum value detection circuit 104, a minimum value detection circuit 105, a monotone increase detection circuit 106, a monotone decrease detection circuit 107, and a binarization circuit 114.

A sync separation circuit 119 separates the inputted digital video signal S102 into a horizontal sync signal S119a and a vertical sync signal S119b, and outputs these signals to a clock run-in (CRI) period setting circuit 118. The horizontal sync signal S119a and the vertical sync signal S119b are used for setting a position of a CRI period.

A CRI period setting circuit 118 generates a CRI period setting signal S118 for setting a CRI period of the telecast data superimposed in the digital video signal S102, on the basis of the vertical sync signal S119b and the horizontal sync signal S119a, and outputs the CRI period setting signal S118 to the monotone increase detection circuit 106, the monotone decrease detection circuit 107, and a counter 108.

The monotone increase detection circuit 106 detects whether the amplitude values of the digital data at continuous three or more sampling points monotonously increase or not, on the basis of the CRI period setting signal S118 and the noise-removed digital video signal S103. When the monotone increase detection circuit 106 detects the monotone increase, it outputs a monotone increase detection signal S106 to the maximum value detection circuit 104, the minimum value detection circuit 105, the counter 108, and a CRI period determination circuit 112.

The monotone decrease detection circuit 107 detects whether the amplitude values of the digital data at continuous three or more sampling points monotonously decrease or not, on the basis of the CRI period setting signal S118 and the noise-removed digital video signal S103. When the monotone decrease detection circuit 107 detects the monotone decrease, it outputs a monotone decrease detection signal S107 to a data holding circuit 110.

The maximum value detection circuit 104 detects a maximum value S104 of the amplitudes of the digital data within the period during which the monotone increase is detected, on the basis of the monotone increase detection signal S106 and the noise-removed digital video signal S103, and outputs the maximum value S104 to a slice level calculation circuit 113.

The minimum value detection circuit 105 detects a minimum value S105 of the amplitudes of the digital data within the period during which the monotone increase is detected, on the basis of the monotone increase detection signal S106 and the noise-removed digital video signal S103, and outputs the minimum value S105 to the slice level calculation circuit 113.

The counter 108 receives the CRI period setting signal S118 and the monotone increase detection signal S106, and performs counting with the sampling clock during the period in which the CRI period setting signal S118 is effective while resetting the count at the timing when the monotone increase detection signal S106 becomes "H", and outputs the result of counting as a count value S108 to the data holding circuit 110 and the CRI period determination circuit 112.

The data holding circuit 110 receives the count value S108 and the monotone decrease detection signal S107, and loads the count value S100 at the timing when the monotone decrease detection signal S107 becomes "H", and simultaneously, holds the count value until the next monotone decrease detection signal S107 is generated, and outputs the count value as a monotone increase monotone decrease interval value S110 to the CRI period determination circuit 112.

A telecast mode storage table 111 contains telecast mode data which are indicated by the ratios between the transmission clocks of the respective telecast modes shown in FIG. 15 and the sampling clock, and outputs various telecast mode data S111 to the CRI period determination circuit 112.

The CRI period determination circuit 112 determines as to whether the data signal is within the CRI period or not, on the basis of the monotone increase detection signal S106, the count value S108, the monotone increase monotone decrease interval value S110, and the various telecast mode data S111. When the CRI period determination circuit 112 determines that the data signal is within the CRI period, it outputs a CRI period determination signal S112 to the slice level calculation circuit 113.

The slice level calculation circuit 113 calculates a slice level S113 by averaging the maximum value S104 and the minimum value S105 which are detected within the period that is judged as the CRI period, on the basis of the maximum value 104, the minimum value S105, and the CRI period determination signal S112, and outputs the slice level S113 to the binarization circuit 114.

The binarization circuit 114 converts the noise-removed video signal S103 into a binarization signal S114 comprising 0 and 1 by the slice level S113, and outputs the binarized signal S114 to a sampling circuit 115.

The sampling circuit 115 samples the binarized signal S114 that is obtained by the binarization circuit 114, at predetermined sampling intervals according to the type of the telecast mode, and outputs the sampled data S115 to a decoding circuit 116.

The decoding circuit 116 converts the serial sampled data S115 into a parallel signal, and subjects the parallel signal to a decoding process according to the type of the telecast, such as error correction, and thereafter, outputs the decoded data S116 through an output terminal 117 to the outside.

Hereinafter, the operation of the data slice control device constructed as described above will be described with reference to FIG. 2. It is assumed that the type of the telecast data is teletext.

Figure 2:
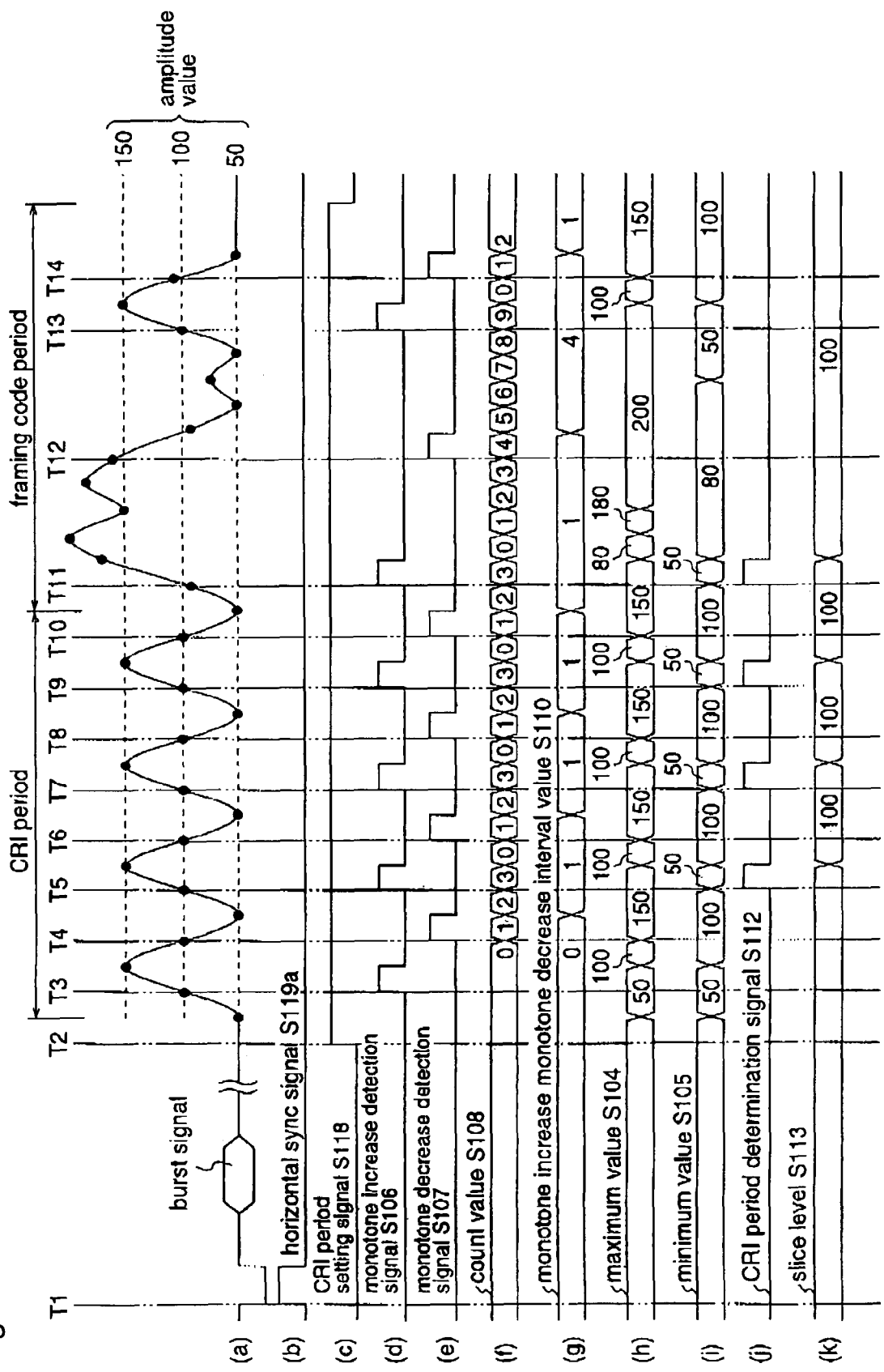
FIGS. 2(a)-2(k) are timing charts for explaining the operation of the data slice control device according to the first embodiment.

FIGS. 2(*a*)-2(*k*) are timing charts for explaining the operation of the data slice control device according to the first embodiment. To be specific, 2(*a*) shows the analog video signal S101, 2(*b*) shows the horizontal sync signal S119a, 2(*c*) shows the CRI period setting signal S111, 2(*d*) shows the monotone increase detection signal S106, 2(*e*) shows the monotone decrease detection signal S107, 2(*f*) shows the counter value S108, 2(*g*) shows the monotone increase monotone decrease interval value S110, 2(*h*) shows the maximum value S104, 2(*i*) shows the minimum value S105, 2(*j*) shows the CRI period determination signal S112, and 2(*k*) shows the slice level S113.

As shown in FIG. 2(*a*), the analog video signal S101 supplied from the video signal input terminal 101 includes such as a horizontal sync signal, a burst signal, CRI data, and framing code data indicating the type of telecast or the like. In FIG. 2(*a*), black dots indicate the points sampled by the sampling clock. It is assumed that, in this first embodiment, the analog video signal S102 is sampled at a sampling clock that is twice as high as the transmission clock.

At time T1, the sync separation circuit 119 separates the horizontal sync signal S119a as shown in FIG. 2(*b*) from the digital video signal S102 that is obtained by digitizing the analog video signal S101 with the A/D converter 102.

At time T2, the CRI period setting circuit 118 generates a CRI period setting signal S118 for setting a CRI period, which is shown in FIG. 2(*c*), on the basis of the horizontal sync signal S119a. The CRI period setting signal S118 is not necessarily set so as to precisely include only the CRI period, and it may include a framing code period besides the CRI period.

At times T3, T5, T7, T9, T11, and T13, the monotone increase detection circuit 106 generates a monotone increase detection signal S106 shown in FIG. 2(*d*) on the basis of the noise-removed digital video signal S103 and the CRI period setting signal S118 shown in FIG. 2(*c*). Taking time T3 as an example, the monotone increase detection circuit 106 changes the monotone increase detection signal S106 to "H", when the CRI period setting signal S118 is "H", and the amplitude value at the sampling point of the digital video signal at time T3 is larger than the amplitude value at the sampling point which is one sampling point before that at time T3 and smaller than the amplitude value at the sampling point which is one sampling point after that at time T3, i.e., when it is detected that the amplitude values at three or more consecutive sampling points monotonously increase. In this first embodiment, for simplification, it is assumed that the monotone increase detection signal S106 is changed to "H" when it is detected that the amplitude values at three consecutive sampling points monotonously increase.

At times T4, T6, T8, T10, T12, and T14, the monotone decrease detection circuit 107 generates a monotone decrease detection signal S107 shown in FIG. 2(*e*) on the basis of the noise-removed digital video signal S103 and the CRI period setting signal S118 shown in FIG. 2(*c*). Taking time T4 as an example, the monotone decrease detection circuit 107 changes the monotone decrease detection signal S107 to "H", when the CRI period setting signal S118 is "H", and the amplitude value at the sampling point of the digital video signal at time T4 is smaller than the amplitude value at the sampling point which is one sampling point before that at time T4 and larger than the amplitude value at the sampling point which is one sampling point after that at time T4, i.e., when it is detected that the amplitude values at three or more consecutive sampling points monotonously decrease. In this first embodiment, for simplification, it is assumed that the monotone decrease detection signal S107 is changed to "H" when it is detected that the amplitude values at three consecutive sampling points monotonously decrease.

The counter 108 performs counting only when the CRI period setting signal S118 shown in FIG. 2(*c*) is "H", and resets the count at the timing when the monotone increase detection signal S106 shown in FIG. 2(*d*) becomes "H". That is, the count value of the counter 108 changes as shown in FIG. 2(*f*).

The data holding circuit 110 loads the count values shown in FIG. 2(*f*) at the timing when the monotone decrease detection signal S107 shown in FIG. 2(*e*) becomes "H", and holds the count values as the monotone increase monotone decrease interval data shown in FIG. 2(*g*).

The maximum value detection circuit 104 detects the maximum value S104 of the amplitude values of the digital data as shown in FIG. 2(*h*) from the noise-removed digital video signal S103. However, the maximum value detection circuit 104 detects the maximum value during the period from when the monotone increase detection signal S106 shown in FIG. 2(*d*) becomes "H" to when the next monotone increase detection signal S106 becomes "H". That is, when the monotone increase detection signal S106 becomes "H", the maximum value up to now is cleared, and detection of a maximum value is again carried out.

The minimum value detection circuit 105 detects the minimum value S105 of the amplitude values of the digital data as shown in FIG. 2(*i*) from the noise-removed digital video signal S103. However, the minimum value detection circuit 104 detects the minimum value during the period from when the monotone increase detection signal S106 shown in FIG. 2(*d*) becomes "H" to when the next monotone increase detection signal S106 becomes "H". That is, when the monotone increase detection signal S106 becomes "H", the minimum value up to now is cleared, and detection of a minimum value is again carried out.

The CRI period determination circuit 112 generates a CRI period determination signal S112 shown in FIG. 2(*j*) on the basis of the count value S108 obtained from the counter 108, the monotone increase detection signal S106 obtained from the monotone increase detection circuit 106, and the monotone increase monotone decrease interval value S110 obtained from the data holding circuit 110. As shown by the black dots in FIG. 2(*a*), since the analog signal in which the teletext signal is superimposed is sampled at the sampling clock that is twice as high as the transmission clock, the CRI period is equivalent to 4 sampling points. At time T3, the monotone increase detection signal S106 becomes "H", and the count value S108 at this time is 0 as shown in FIG. 2(*f*), and the monotone increase monotone decrease interval value S110 is also 0 as shown in FIG. 2(*g*). When a normal CRI is detected, since the counter 108 starts counting from 0, the count value becomes 3 which is obtained by subtracting 1 from 4 that corresponds to the CRI period. Further, the monotone increase monotone decrease interval value becomes 1 which is obtained by subtracting 1 from 2 that corresponds to the period of the transmission clock. At time T3, since both of the count value and the monotone increase monotone decrease interval value are 0, these values are determined as abnormal, and no CRI period determination signal S112 is generated. At time T5, the count value S108 at the timing when the monotone increase detection signal S106 becomes "H" is 3 as shown in FIG. 2(*f*), and the monotone increase monotone decrease interval value S110 is 1 as shown in FIG. 2(*g*). In this case, since both of the count value and the monotone increase monotone decrease interval value are normal, a CRI period determination signal S112 is generated as shown in FIG. 2(*j*). That is, the CRI period determination signal S112 becomes "H". Likewise, at times T7, T9, and T11, a CRI period determination signal S112 is generated. At time T13, although the monotone increase detection signal S106 becomes "H", the count value S108 at this time becomes 9 as shown in FIG. 2(*f*), and the monotone increase monotone decrease interval value S110 becomes 4 as shown in FIG. 2(*g*). Therefore, these values are determined as abnormal, and no CRI period determination signal S112 is generated.

The slice level calculation circuit 113 calculates a slice level S113 using the maximum value S104, the minimum value S105, and the CRI period determination signal S112. The slice level calculation circuit 113 loads the maximum value S104 and the minimum value S105 at the timing when the CRI period determination signal S112 shown in FIG. 2(*j*) becomes "H", and outputs the average of the maximum value S104 and the minimum value S105 at this time, as a slice level S113 shown in FIG. 2(*k*).

As shown in FIG. 2(*a*), even when the signal is disturbed due to ghosts or noises and thereby the maximum value becomes larger than the usual maximum value during the framing code period, the maximum value S104 and the minimum value S105 are successively detected as shown in FIG. 2(*h*) and FIG. 2(*i*), respectively, during the period from time T11 to time T12, but no CRI period determination signal S112 is generated. Therefore, no slice level S113 is calculated from the maximum value S104 and the minimum value S105 which are detected at this timing, as shown in FIG. 2(*k*).

The data slice control device according to the first embodiment of the invention provides the following effects. Since the telecast signals typified by a teletext signal is superimposed in the vertical blanking period of the television signal, the horizontal sync signal S119*a* that is separated by the sync separation circuit 119 is disturbed by such as a macrovision signal of a copy guard signal that is superimposed in the vertical blanking period. Therefore, the horizontal sync signal S119a in the line where the teletext signal is superimposed is not always separated in the position shown in FIG. 2(b). Therefore, it is considerably difficult to set the CRI period setting signal S118, which is generated with reference to the horizontal sync signal S119a, so as to include only the CRI period. Accordingly, as described above, the data slice control device according to the first embodiment calculates the monotone increase point and monotone decrease point of data, the monotone increase interval value from the monotone increase point to the next monotone increase point, and the monotone increase monotone decrease interval value from the monotone increase point to the monotone decrease point, and determines a CRI period from the monotone increase interval value and the monotone increase monotone decrease interval value, and then calculates a slice level only in the determined period. Therefore, even when the horizontal sync signal S119a is disturbed, an accurate slice level can be detected.

Furthermore, since the CRI detection is carried out on the basis of the type of the telecast mode and the frequency of the sampling clock, only the sampling clock should be determined to perform accurate calculation of slice levels corresponding to not only the teletext employed in Europe but also VPS, WSS, multiplex telecast employed in Japan, electron programming guide (EPG), and closed caption employed in U.S.A., i.e., the data slice control device according to the first embodiment is adaptable to the telecast modes employed all over the world.

Embodiment 2

Figure 3:
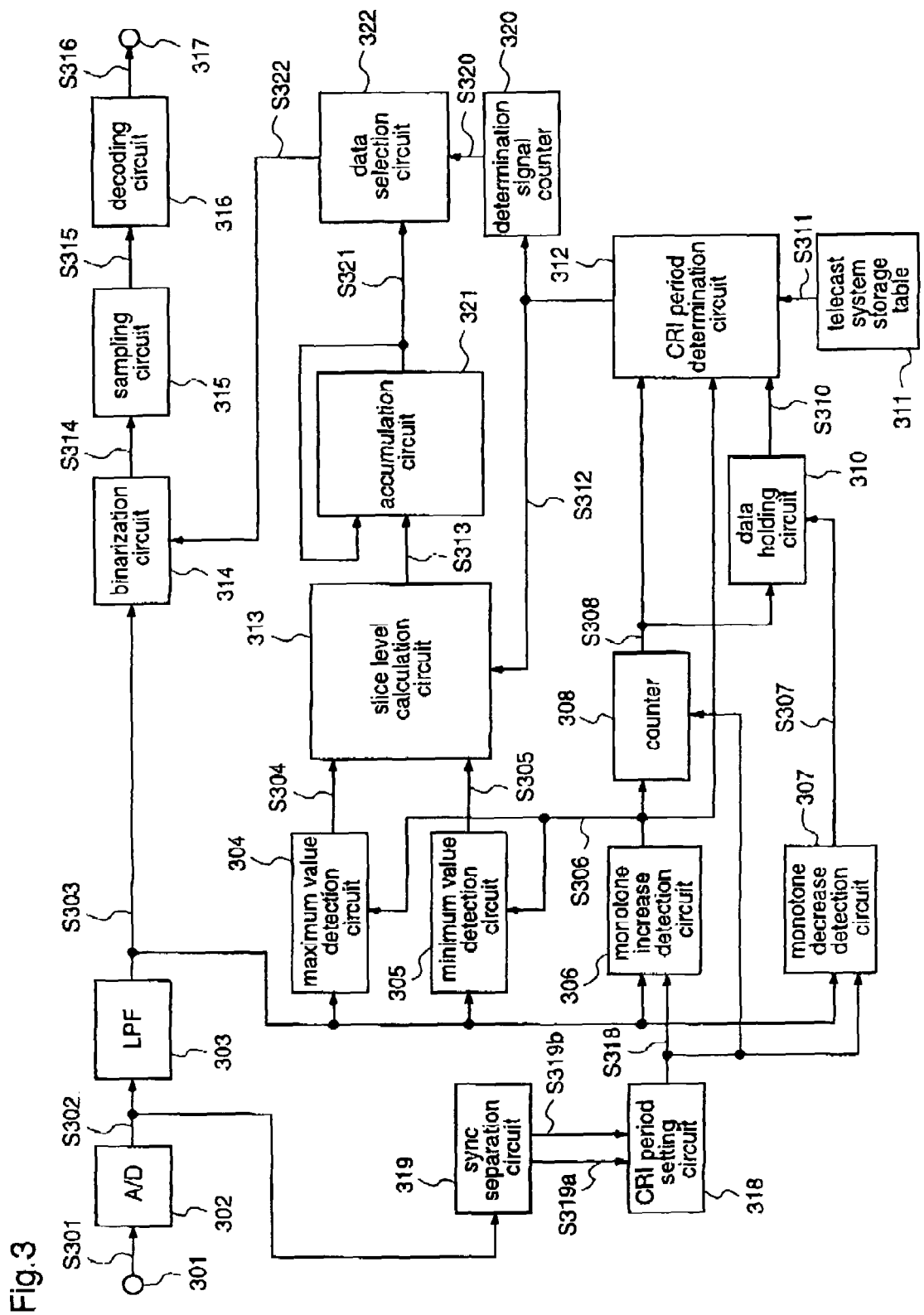
FIG. 3 is a block diagram illustrating the construction of a data slice control device according to a second embodiment of the present invention.

A data slice control device according to a second embodiment of the present invention will be described with reference to FIGS. 3 and 4. FIG. 3 is a block diagram illustrating the construction of the data slice control device according to the second embodiment. With reference to FIG. 3, the data slice control device according to the second embodiment is provided with a determination signal counter 320, an accumulation circuit 321, and a data selection circuit 322, in addition to the constituents of the data slice control device according to the first embodiment. The constituents other than mentioned above are identical to those described for the first embodiment, and therefore, repeated description is not necessary.

In FIG. 3, the determination signal counter 320 counts the CRI period determination signal S312 outputted from the CRI period determination circuit 312, and outputs the result of counting as a determination signal count value S320 during the CRI period to the data selection circuit 322.

The accumulation circuit 321 accumulates the slice level S313 calculated by the slice level calculation circuit 313, and outputs the result as an accumulated value S321 to the data selection circuit 322.

The data selection circuit 322 selects an optimum slice level on the basis of the CRI period determination signal count value S320 and the accumulated value S321, and outputs the selected slice level S322 to the binarization circuit 314.

Hereinafter, a description will be given of the operation of the data slice control device constructed as described above, with reference to FIG. 4. It is assumed that the type of the telecast data employed in this second embodiment is teletext data. FIGS. 4(a)-4(k) are timing charts for explaining the operation of the data slice control device according to the second embodiment. To be specific, 4(a) shows an analog video signal S301, 4(b) shows a horizontal sync signal S319a, 4(c) shows a CRI period setting signal S318, 4(d) shows the monotone increase detection signal S306, 4(e) shows a monotone decrease detection signal S307, 4(f) shows a counter value S308, 4(g) shows a monotone increase monotone decrease interval value S310, 4(h) shows a CRI period determination signal S312, 4(i) shows a slice level S313, 4(j) shows a determination signal count value S320, 4(k) shows an accumulated value S321, and 4(l) shows a selected slice level S322.

The analog video signal S301 inputted to the video signal input terminal 301 includes such as a horizontal sync signal, a burst signal, CRI data, and framing code data that shows the type of telecast or the like, as shown in FIG. 4(a). In FIG. 4(a), black dots indicate the points sampled by the sampling clock, and the sampling clock is twice as high as the transmission clock.

At time T1, the sync separation circuit 319 separates the horizontal sync signal S319a as shown in FIG. 4(b) from the digital video signal S302 that is obtained by digitizing the analog video signal S301 using the A/D converter 302.

At time T2, the CRI period setting circuit 318 generates a CRI period setting signal S318 for setting the CRI period shown in FIG. 4(c), on the basis of the horizontal sync signal S319a. The CRI period setting signal S318 is not necessarily set so as to precisely include only the CRI period, and it may include a framing code period besides the CRI period.

At times T3, T5, T7, T9, T11, and T13, the monotone increase detection circuit 306 generates a monotone increase detection signal S306 shown in FIG. 4(d) on the basis of the noise-removed digital video signal S303 and the CRI period setting signal S318 shown in FIG. 4(c). The method of generating the monotone increase detection signal S306 is identical to the method of generating the monotone increase detection signal S106 according to the first embodiment, and therefore, repeated description is not necessary.

At times T4, T6, T8, T10, T12, and T14, the monotone decrease detection circuit 307 generates a monotone decrease detection signal S307 shown in FIG. 4(e) on the basis of the noise-removed digital video signal S303 and the CRI period setting signal S318 shown in FIG. 4(c). The method of generating the monotone decrease detection signal S307 is identical to the method of generating the monotone increase detection signal S107 according to the first embodiment, and therefore, repeated description is not necessary.

The counter 308 operates only when the CRI period setting signal S318 shown in FIG. 4(c) is "H", and resets the count at the timing when the monotone increase detection signal S306 shown in FIG. 4(d) becomes "H". That is, the count value of the counter 308 changes as shown in FIG. 4(f).

The data holding circuit 310 loads the count value shown in FIG. 4(f) at the timing when the monotone decrease detection signal S307 shown in FIG. 4(e) becomes "H", and holds the count value as the monotone increase monotone decrease interval data shown in FIG. 4(g).

The maximum value detection circuit 304 detects the maximum value S304 of the amplitude values of the noise-removed digital video signal S303. However, the maximum value detection circuit 304 detects the maximum value during a period from when the monotone increase detection signal S306 shown in FIG. 4(d) becomes "H" to when the next monotone increase detection signal S306 becomes "H". That is, when the monotone increase detection signal S306 becomes "H", the maximum value up to slow is cleared, and detection of a maximum value is again carried out. Since detection of the maximum value S304 by the maximum value detection circuit 304 is carried out in the same method for detecting the maximum value S104 according to the first embodiment, it is omitted in FIG. 4.

The minimum value detection circuit 305 detects the minimum value S305 of the amplitude values of the noise-removed digital video signal S303. However, the minimum value detection circuit 305 detects the minimum value during a period from when the monotone increase detection signal S306 shown in FIG. 4(d) becomes "H" to when the next monotone increase detection signal S306 becomes "H". That is, when the monotone increase detection signal S306 becomes "H", the minimum value up to now is cleared, and detection of a minimum value is again carried out. Since detection of the minimum value S305 by the minimum value detection circuit 305 is carried out in the same method for detecting the minimum value S105 according to the first embodiment, it is omitted in FIG. 4.

The CRI period determination circuit 312 generates a CRI period determination signal S312 shown in FIG. 4(h) on the basis of the count value S308 obtained from the counter 308, the monotone increase detection signal S306 obtained from the monotone increase detection circuit 306, and the monotone increase monotone decrease interval value S310 obtained from the data holding circuit 310. As shown by the black dots in FIG. 4(a), since the analog signal in which the teletext signal is superimposed is sampled at the sampling clock that is twice as high as the transmission clock, the CRI period corresponds to 4 sampling points. At time T3, the monotone increase detection signal S306 becomes "H", and the count value S308 at this time is 0 as shown in FIG. 4(f), and the monotone increase monotone decrease interval value S310 is also 0 as shown in FIG. 4(g). When a normal CRI is detected, since the counter 308 starts counting from 0, the count value becomes 3 which is obtained by subtracting 1 from 4 that corresponds to the CRI period. Further, the monotone increase monotone decrease interval value becomes 1 which is obtained by subtracting 1 from 2 that corresponds to the period of the transmission clock. At time T3, since both of the count value and the monotone increase monotone decrease interval value are 0, these values are determined as abnormal, and no CRI period determination signal S312 is generated. At time T5, the count value S308 at the timing when the monotone increase detection signal S306 is "H" is 3 as shown in FIG. 4(f), and the monotone increase monotone decrease interval value S310 is 1 as shown in FIG. 4(g). In this case, since both of the count value and the monotone increase monotone decrease interval value are normal, a CRI period determination signal S312 is generated as shown in FIG. 4(j). That is, the CRI period determination signal S312 becomes "H". Likewise, at times T7, T9, and T11, a CRI period determination signal S312 is generated. Although the monotone increase detection signal S306 becomes "H" at time T13, the count value S308 at this time becomes 9 as shown in FIG. 4(f), and the monotone increase monotone decrease interval value S310 becomes 4 as shown in FIG. 4(g). Therefore, these values are determined as abnormal, and no CRI period determination signal S312 is generated.

The slice level calculation circuit 313 calculates a slice level S313 using the maximum value S304, the minimum value S305, and the CRI period determination signal S312. The slice level calculation circuit 313 loads the maximum value S304 and the minimum value S305 at the timing when the CRI period determination signal S312 shown in FIG. 4(h) becomes "H", and outputs the average of the maximum value S304 and the minimum value S305 at this time as a slice level S313 shown in FIG. 4(i).

The determination signal counter 320 performs counting only when the CRI period determination signal S312 is "H", and the counting result changes as the determination signal count value S320 shown in FIG. 4(j).

The accumulation circuit 321 successively accumulates the slice level S313 shown in FIG. 4(i) to obtain an accumulated value S321 as shown in FIG. 4(k).

The data selection circuit 322 calculates a selected slice level S322 on the basis of the accumulated value S321 obtained from the accumulation circuit 321 and the determination signal count value S320 obtained by the determination signal counter 320. In the telecasts represented by teletext, the CRI corresponds to 8 periods at maximum, and therefore, the determination signal count value S320 is controlled so as not to exceed 8. As a method for calculating a selected slice level S322, the accumulated value S321 is divided by the determination signal count value S320, and the result is used as a selected slice level S322. In this second embodiment, however, in order to prevent an increase in the circuit scale, division is not carried out, and a selected slice level S322 is obtained using only shift operation. This method will be described hereinafter. Initially, there are prepared data ACMD1 which is obtained without bit-shifting the accumulated value S321, data ACMD2 obtained by shifting the value S321 by one bit to the right, data ACMD4 obtained shifting the value S321 by two bits to the right, and data ACMD8 obtained by shifting the value S321 by three bits to the right, and an optimum data is selected from among the ACMD1, ACMD2, ACMD4, and ACMD8 on the basis of the determination signal count value S320. That is, the ACMD1 is selected when the determination signal count value is 1, the ACMD2 is selected when the count value is 2 or 3, the ACMD3 is selected when the count value is 4, 5, 6, or 7, and the ACMD4 is selected when the count value is 8 or more. To be specific, in FIG. 4(l), when the determination signal count value S320 is 1, the value 115 of the accumulated value S321 is selected as it is. When the determination signal count value S320 is 2 or 3, the value 102 that is obtained by shifting the value 205 of the accumulated value S321 by one bit to the right, i.e., by dividing the value 205 with 2, is selected. When the determination signal count value S320 becomes 4, the value 103 obtained by shifting the value 415 of the accumulated value S321 by two bits to the right, i.e., by dividing the value 415 by 4, is selected. Although the largest accumulated count value shown in FIG. 4 is 4, the count value is successively selected by the above-mentioned method.

As described above, in the data control device according to the second embodiment, the slice level and the timing when the CRI period determination signal becomes "H" are counted, and a slice level at which the CRI does not exceed the maximum period is selected. Therefore, as shown in FIG. 4(a), even when the signal is disturbed due to ghosts or noises and thereby the maximum value becomes larger or smaller than the usual maximum value during the CRI period or the framing code period, it is possible to calculate an accurate slice level while reducing the adverse effects of ghosts and noise, by calculating slice levels only in the CRI period including the same frequency component, and taking the average of the slice levels.

Further, like the data slice control device according to the first embodiment, even when the horizontal sync signal S119a is disturbed, an accurate slice level can be detected.

Further, the data slice control device according to the second embodiment is adaptable to the telecast modes employed all over the world.

Figure 4:
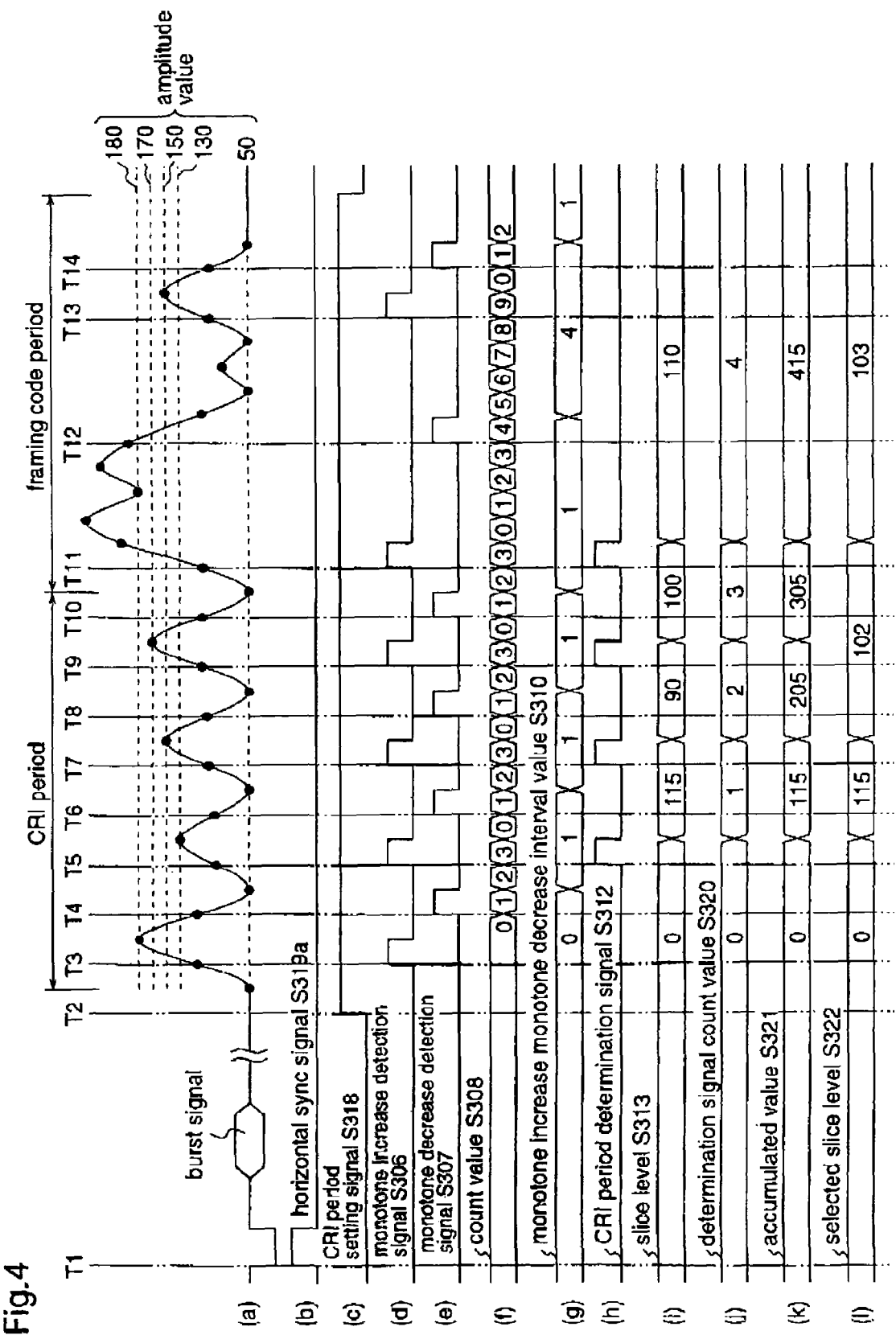
FIGS. 4(a)-4(l) are timing charts for explaining the operation of the data slice control device according to the second embodiment.

While in FIG. 4 the above-mentioned method is employed for slice level selection to reduce the circuit scale. However, the accumulated value S321 may be simply divided by the determination signal count value S320 to use the result as a selected slice level.

Embodiment 3

Figure 5:
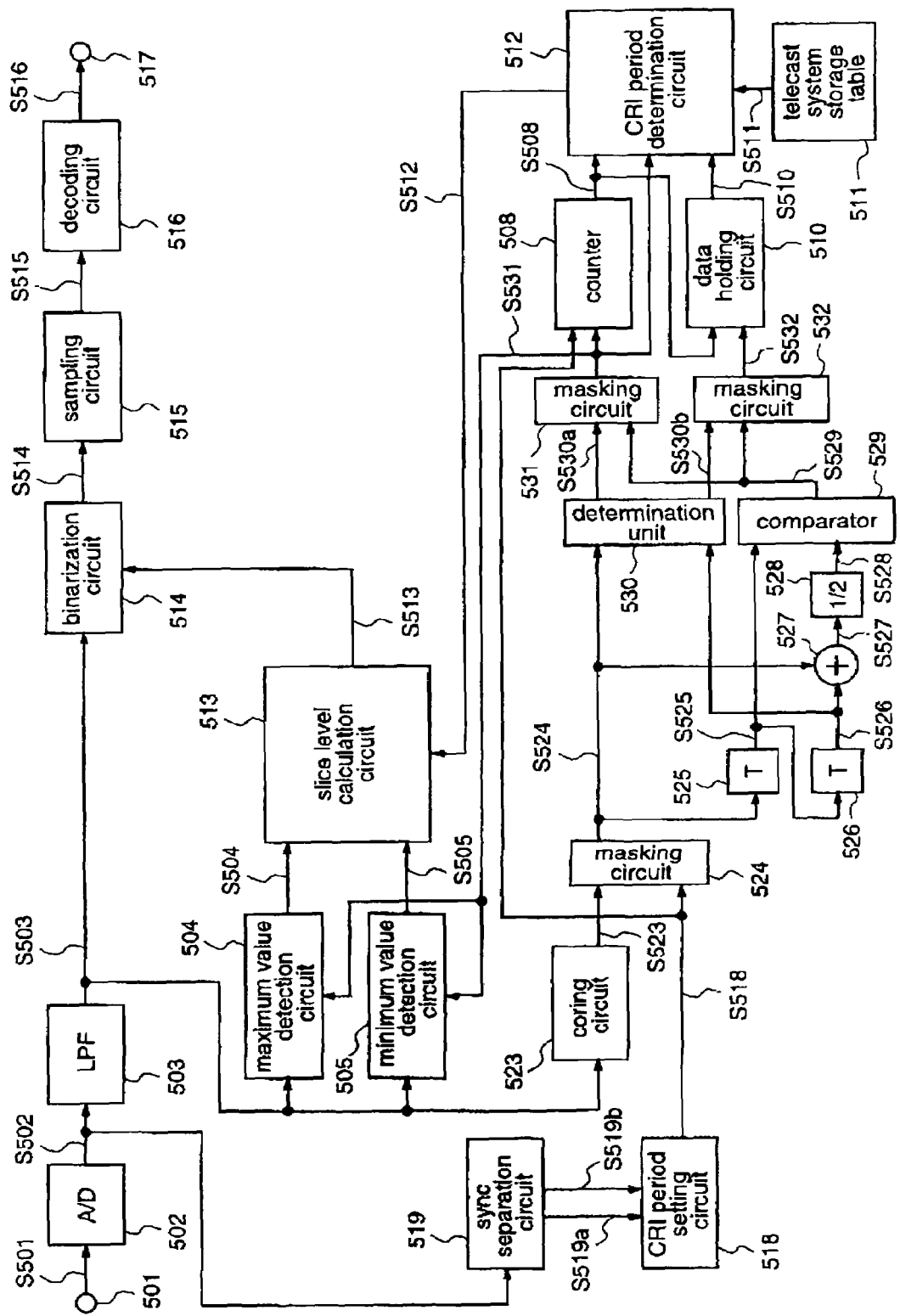
FIG. 5 is a block diagram illustrating the construction of a data slice control device according to a third embodiment of the present invention.

Hereinafter, a data slice control device according to a third embodiment of the present invention will be described with reference to FIG. 5. FIG. 5 is a block diagram illustrating the construction of the data slice control device according to the third embodiment.

In FIG. 5, a video signal input terminal 501 receives an analog video signal S501 in which telecast data are superposed in a vertical blanking period.

An A/D converter 502 samples the analog video signal S501 at a predetermined sampling clock fs (MHz) to convert the analog video signal S501 into a digital video signal S502, and outputs the digital video signal S502 to a low-pass filter (LPF) 503.

The LPF 503 subjects the inputted digital video signal S502 to noise removal, and outputs the noise-removed digital video signal S503 to a maximum value detection circuit 504, a minimum value detection circuit 505, a coring circuit 523, and a binarization circuit 514.

A sync separation circuit 519 separates the inputted digital video signal S502 into a horizontal sync signal S519$a$ and a vertical sync signal S519$b$, and outputs these signals to a CRI period setting circuit 518. The horizontal sync signal S519$a$ and the vertical sync signal S519$b$ are used for setting the position of the CRI period.

The CRI period setting circuit 518 generates a CRI period setting signal S518 for setting a CRI period of the telecast data that is superimposed on the digital video signal S502, on the basis of the vertical sync signal S519$b$ and the horizontal sync signal S519$a$, and outputs the CRI period setting signal S518 to a masking circuit 524 and a counter 508.

The coring circuit 523 subjects the noise-removed digital video signal S503 to coring, and outputs coring data S523 to the masking circuit 524. The coring is a process in which 0 is output when the noise-removed digital video signal S503 (data value) is smaller than a coring level CORLMTD, and a value obtained by subtracting the coring level CORLMTD from the data value of the digital video signal S503 is output when the digital video signal S503 is larger than the coring level CORLMTD.

The masking circuit 524 performs masking to make the coring data S523 ineffective during a period other than when the CRI period setting signal S518 is effective, and outputs the result to a delay unit 525 and a judgement unit 530. The masking is a process of setting the coring data S523 to an arbitrary fixed value during the period when the CRI period setting signal S518 is ineffective.

The delay unit 525 delays the coring data S524 that has been subjected to masking, by one sampling clock (1T), and outputs the data S524 to a comparator 529 and a delay unit 526.

The delay unit 526 delays the data S525 that has been 1T-delayed by the delay unit 525, by another 1T, and outputs the data S525 to an adder 527 and the judgement unit 530.

The adder 527 adds the masking-processed coring data S524 and the data S526 that has been obtained by 2T-delaying the masking-processed coring data, and outputs the sum to a bit shifting unit 528.

The bit shifting unit 528 shifts the data S527 obtained by the adder 527 by one bit to the right, and outputs the data to the comparator 529. The one-bit right shifting halves the added data S527.

The comparator 529 compares the 1T-delayed data S525 with the one-bit right shifted data S528. The comparator 529 checks whether or not the one-bit right shifted data S528 exists between a value that is obtained by subtracting a threshold value α from the 1T-delayed data S525 and a value that is obtained by adding the threshold value α to the 1T-delayed data S525, and outputs a comparison result signal S529 as a signal that becomes effective only when the data S528 exists, to the masking circuits 531 and 532.

Using the masking-processed coring data S524 and the 2T-delayed data S526, the judgement unit 530 judges that the amplitude values at the sampling points of the digital data monotonously increase, when the masking-processed coring data S524 is larger than a value that is obtained by adding an arbitrary value β to the 2T-delayed data S526, and generates a monotone increase signal S530$a$ to be output to the masking circuit 531. When the 2T-delayed data S526 is larger than the value that is obtained by adding the arbitrary value β to the masking-processed coring data S524, the judgement unit 530 judges that the amplitude values of the digital data monotonously decrease, and generates a monotone decrease signal S530$b$ to be output to the masking circuit 532.

The masking circuit 531 receives the monotone increase signal S530$a$ and the comparison result signal S529, and generates a monotone increase detection signal S531 when both of these signals are effective, and outputs the signal S531 to the counter S508, the maximum value detection circuit 504, the minimum value detection circuit 505, and the CRI period determination circuit 512.

The masking circuit 532 receives the monotone decrease signal S530$b$ and the comparison result signal S529, and generates a monotone decrease detection signal S532 when both of these signals are effective, and outputs the signal S532 to the data holding circuit 510.

The maximum value detection circuit 504 detects a maximum value S504 the amplitude values of the digital data within the period during which monotone increase is detected, on the basis of the monotone increase detection signal S531 and the noise-removed digital video signal S503, and outputs the maximum value S504 to a slice level calculation circuit 513.

The minimum value detection circuit 505 detects a minimum value S505 of the amplitude values of the digital data within the period during which monotone increase is detected, on the basis of the monotone increase detection signal S531 and the noise-removed digital video signal S503, and outputs the minimum value S505 to the slice level calculation circuit 513.

The counter 508 receives the CRI period setting signal S518 and the monotone increase detection signal S531, and performs counting with the sampling clock during the period in which the CRI period setting signal S518 is effective, while resetting the count at the timing when the monotone increase detection signal S531 becomes "H", and outputs the result of counting as a count value S508 to the data holding circuit 510 and the CRI period determination circuit 512.

The data holding circuit 510 receives the count value S508 and the monotone decrease detection signal S532, and loads the count value S508 at the timing when the monotone decrease detection signal S532 becomes "H", and holds the data until the next monotone decrease detection signal S532 is generated (until the next timing when the monotone decrease detection signal S532 becomes "H"), and outputs a monotone increase monotone decrease interval value S510 to the CRI period determination circuit 512.

A telecast mode storage table 511 contains telecast mode data which are indicated by the ratios between the transmission clocks of the various telecast modes shown in FIG. 15 and the sampling clock, and outputs the various telecast mode data S511 to the CRI period determination circuit S512.

The CRI period determination circuit 512 determines whether the data signal is within the CRI period or not, on the basis of the monotone increase detection signal S531, the count value S508, the monotone increase monotone decrease interval value S510, and the various telecast mode data S111. When the CRI period determination circuit 512 determines that the data signal is within the CRI period, it outputs a CRI period determination signal S512 to the slice level calculation circuit 513.

The slice level calculation circuit 513 averages the maximum value S504 and the minimum value S505 which are detected during the period determined as the CRI period, on the basis of the maximum value S504, the minimum value S505, and the CRI period determination signal S512, thereby to calculate a slice level S513, and outputs the slice level S513 to the binarization circuit 514.

The binarization circuit 514 converts the noise-removed digital video signal S503 into a binarized signal S514 comprising 0 and 1 by the slice level S513, and outputs the binarized signal S514 to a sampling circuit 515.

The sampling circuit 515 samples the binarized signal S514 that is outputted from the binarization circuit 514, at predetermined sampling intervals according to the type of the telecast mode, and outputs the sampled data S515 to a decoding circuit 516.

The decoding circuit 516 converts the serial sampled data S515 into a parallel signal, and subjects the data S515 to a decoding process according to the type of the telecast, such as error detection, and then outputs the decoded data S516 through an output terminal 517 to the outside.

As described above, the data control device according to the third embodiment provides the following effects. When the data superimposed on the video signal is telecast data, the telecast data exists at a level higher than the pedestal level of the video signal. Therefore, it is possible to reduce the adverse effects of noises lower than the pedestal level, by performing coring on the data signal using the coring circuit 523. Further, in this third embodiment, monotone increase detection and monotone decrease detection are carried out at the continuous three sampling points, and further, inclinations of monotone increase and monotone decrease are calculated and determined using the comparator 529 and the judgement unit 530. Therefore, it is possible to perform more accurate monotone increase detection and monotone decrease detection while reducing adverse effects of noises or the like. As a result, the slice level to be calculated in the subsequent stage becomes to have higher accuracy.

Further, like the data slice control device according to the first embodiment, even when the horizontal sync signal is disturbed, an accurate slice level can be detected. Furthermore, the data slice control device according to the third embodiment is adaptable to the telecast modes employed all over the world.

Embodiment 4

Figure 6:
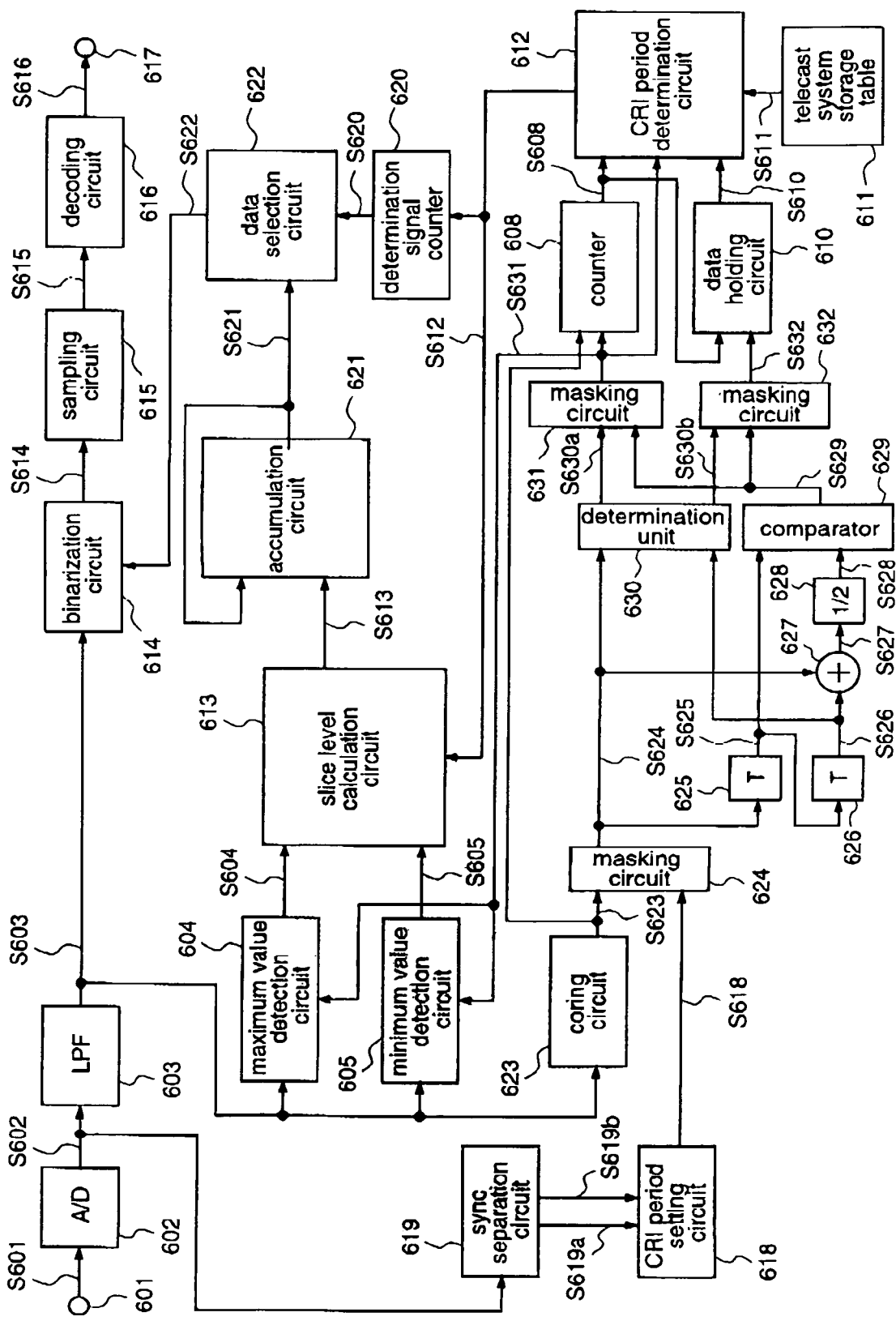
FIG. 6 is a block diagram illustrating the construction of a data slice control device according to a fourth embodiment of the present invention.

Hereinafter, a data slice control device according to a fourth embodiment of the present invention will be described with reference to FIG. 6. FIG. 6 is a block diagram illustrating the construction of the data slice control device according to the fourth embodiment.

In FIG. 6, a video signal input terminal 601 receives an analog video signal S601 in which telecast data are superposed in a vertical blanking period.

An A/D converter 602 samples the analog video signal S601 at a predetermined sampling clock fs (MHz) to convert the analog video signal S601 into a digital video signal S602, and outputs the digital video signal S602 to a low-pass filter (LPF) 603.

The LPF 603 subjects the inputted digital video signal S602 to noise removal, and outputs the noise-removed digital video signal S603 to a maximum value detection circuit 604, a minimum value detection circuit 605, a coring circuit 623, and a binarization circuit 614.

A sync separation circuit 619 separates the inputted digital video signal S602 into a horizontal sync signal S619a and a vertical sync signal S619b, and outputs these signals to a CRI period setting circuit 618. The horizontal sync signal S619a and the vertical sync signal S619b are used for setting the position of the CRI period or the like.

The CRI period setting circuit 618 generates a CRI period setting signal S618 for setting a CRI period of the telecast data that is superimposed on the digital video signal S602, on the basis of the vertical sync signal S619b and the horizontal sync signal S619a, and outputs the CRI period setting signal S618 to a masking circuit 624 and a counter 608.

The coring circuit 623 subjects the noise-removed digital video signal S603 to coring, and outputs coring data S623 to the masking circuit 624. The coring is a process in which 0 is output when the noise-removed digital video signal S603 (data value) is smaller than a coring level CORLMTD, and a value obtained by subtracting the coring level CORLMTD from the data value of the digital video signal S603 is output when the digital video signal S603 is larger than the coring level CORLMTD.

The masking circlet 624 performs masking to make the coring data S623 ineffective during a period other than when the CRI period setting signal S618 is effective, and outputs the result to a delay unit 625 and a judgement unit 630. The masking is a process of setting the coring data S623 to an arbitrary fixed value during the period when the CRI period setting signal S618 is ineffective.

The delay unit 625 delays the coring data S624 that has been subjected to masking, by one sampling clock (1T), and outputs the data S624 to a comparator 629 and a delay unit 626.

The delay unit 626 delays the data S625 that has been 1T-delayed by the delay unit 625, by another 1T, and outputs the data S625 to an adder 627 and the judgement unit 630. This data is 2T-delayed with respect to the coring data S624 that has been subjected to masking.

The adder 627 adds the masking-processed coring data S624 and the data S626 that has been obtained by 2T-delaying the masking-processed coring data, and outputs the sum S627 to a bit shifting unit 628.

The bit shifting unit 628 shifts the data S627 obtained by the adder 627 by one bit to the right, and outputs the data to the comparator 629. The one-bit right shifting halves the added data S627.

The comparator 629 compares the 1T-delayed data S625 with the one-bit right shifted data S628, and outputs the result to masking circuits 631 and 632. The comparator 629 checks whether or not the one-bit right shifted data S628 exists between a value that is obtained by subtracting a threshold value $\alpha$ from the 1T-delayed data S625 and a value that is obtained by adding the threshold value $\alpha$ to the 1T-delayed data S625, and outputs a comparison result signal S629 as a signal that becomes effective only when the data S628 exists.

Using the masking-processed coring data S624 and the 2T-delayed data S626, the judgement unit 630 judges that the amplitude values at the sampling points of the digital data monotonously increase, when the masking-processed coring data S624 is larger than a value that is obtained by adding an arbitrary value $\beta$ to the 2T-delayed data S626, and generates a monotone increase signal S630$a$ to be output to the masking circuit 631. When the 2T-delayed data S626 is larger than the value that is obtained by adding the arbitrary value $\beta$ to the masking-processed coring data S624, the judgement unit 630 judges that the amplitude values at the sampling points of the digital data monotonously decrease, and generates a monotone decrease signal S630$b$ to be output to the masking circuit 632.

The masking circuit 631 receives the monotone increase signal S630$a$ and the comparison result signal S629, and generates a monotone increase detection signal S631 when both of these signals are effective, and outputs the signal S631 to the counter S608, the maximum value detection circuit 604, the minimum value detection circuit 605, and the CRI period determination circuit 612.

The masking circuit 632 receives the monotone decrease signal S630$b$ and the comparison result signal S629, and generates a monotone decrease detection signal S632 when both of these signals are effective, and outputs the signal S632 to the data holding circuit 610.

The maximum value detection circuit 604 detects a maximum value S604 of the amplitude values of the digital data within the period during which monotone increase is detected, on the basis of the monotone increase detection signal S631 and the noise-removed digital video signal S603, and outputs the maximum value S604 to a slice level calculation circuit 613.

The minimum value detection circuit 605 detects a minimum value S605 of the amplitude values of the digital data within the period during which monotone increase is detected, on the basis of the monotone increase detection signal S631 and the noise-removed digital video signal S603, and outputs the minimum value S605 to the slice level calculation circuit 613.

The counter 608 receives the CRI period setting signal S618 and the monotone increase detection signal S631, and performs counting with the sampling clock during the period in which the CRI period setting signal S618 is effective, while resetting the count at the timing when the monotone increase detection signal S631 is "H", and outputs the result of counting as a count value S608 to the data holding circuit 610 and the CRI period determination circuit 612.

The data holding circuit 610 receives the count value S608 and the monotone decrease detection signal S632, and loads the count value S608 at the timing when the monotone decrease detection signal S632 becomes "H", and holds the data until the next monotone decrease detection signal S632 is generated (until the next timing when the monotone decrease detection signal S632 becomes "H"), and outputs a monotone increase monotone decrease interval value S610 to the CRI period determination circuit 612.

A telecast mode storage table 611 contains telecast mode data which are indicated by the ratios between the transmission clocks of the various telecast modes shown in FIG. 15 and the sampling clock, and outputs the various telecast mode data S611 to the CRI period determination circuit S612.

The CRI period determination circuit 612 determines whether the data signal is within the CRI period or not, on the basis of the monotone increase detection signal S631, the count value S608, the monotone increase monotone decrease interval value S610, and the various telecast mode data S611. When the CRI period determination circuit 612 determines that the data signal is within the CRI period, it outputs a CRI period determination signal S612 to the slice level calculation circuit 613.

The slice level-calculation circuit 613 averages the maximum value S604 and the minimum value S605 which are detected during the period that is determined as the CRI period, on the basis of the maximum value S604, the minimum value S605, and the CRI period determination signal S612, thereby to calculate a slice level S613, and outputs the slice level S613 to an accumulation circuit 621.

A determination signal counter 620 counts the CRI period determination signal S612, and outputs the result of counting as a determination signal count value S620 in the CRI period to a data selection circuit 622.

The accumulation circuit 621 accumulates the slice level S613 calculated by the slice level calculation circuit 613, and outputs the result of accumulation as an accumulated value S621 to the data selection circuit 622.

The data selection circuit 622 selects an optimum slice level on the basis of the determination signal count value S620 and the accumulated value S621 during the CRI period, and outputs the selected slice level S622 to the binarization circuit 614. Since the method of calculating a selected slice level is identical to that described for the second embodiment, repeated description is not necessary.

The binarization circuit 614 converts the noise-removed digital video signal S603 into a binarized signal S614 comprising 0 and 1 by the slice level S613, and outputs the binarized signal S614 to a sampling circuit 615.

The sampling circuit 615 samples the binarized signal S614 that is outputted from the binarization circuit 614, at predetermined sampling intervals according to the type of the telecast mode, and outputs the sampled data S615 to a decoding circuit 616.

The decoding circuit 616 converts the serial sampled data S615 into a parallel signal, and subjects the data S615 to a decoding process according to the type of the telecast, such as error detection, and then outputs the decoded data S616 through an output terminal 617 to the outside.

As described above, the data control device according to the third embodiment provides the following effects. That is, when the data superimposed in the video signal is telecast data, the telecast data exists at a level higher than the pedestal level of the video signal. Therefore, it is possible to reduce adverse effects of noises lower than the pedestal level, by subjecting the data signal to coring using the coring circuit 623. Further, in this fourth embodiment, monotone increase detection and monotone decrease detection are carried out at the continuous three sampling points, and furthermore, inclinations of monotone increase and monotone decrease are calculated and determined using the comparator 629 and the judgement unit 630. Therefore, it is possible to perform more accurate monotone increase detection and monotone decrease detection while reducing adverse effects of noises or the like. As a result, the slice level to be calculated in the subsequent stage becomes to have higher accuracy. Furthermore, the timing when the slice level and the CRI period determination signal are "H" is counted to select a slice level at which the CRI does not exceed the maximum cycle. Therefore, even when the signal is disturbed due to ghosts or noises and thereby the maximum value becomes larger or smaller than the usual maximum value during the CRI period or the framing code period, it is possible to obtain an accurate slice level while reducing the adverse effects of ghosts or noises, by calculating slice levels only in the CRI period including the same frequency component, and averaging the slice levels.

Further, like the data slice control device according to the first embodiment, even when the horizontal sync signal is disturbed, an accurate slice level can be detected. Further, the data slice control device according to the fourth embodiment is adaptable to the telecast modes employed all over the world.

While in the first to fourth embodiments monotone increase detection and monotone decrease detection are carried out at three sampling points, monotone increase detection and monotone decrease detection may be carried out at four or more sampling points with the same effects as described above.

Further, while in the first to fourth embodiments the period during which a slice level is to be detected is set so as to include the CRI period, the present invention is not restricted thereto. This period may be set so as to include periods other than the CRI period, such as a data period.

Further, while in the first to fourth embodiments the sampling clock is set twice as high as the transmission clock, the present invention is not restricted thereto. The sampling clock may be set more than twice as high as the transmission clock with the same effects as mentioned above.

Furthermore, while the telecast signal employed in the first to fourth embodiments is a teletext signal, the present invention is not restricted thereto. Even when a signal other than the teletext signal is employed, an accurate slice level can be calculated by detecting a CRI and calculating a slice level during the detected period.

Embodiment 5

Figure 7:
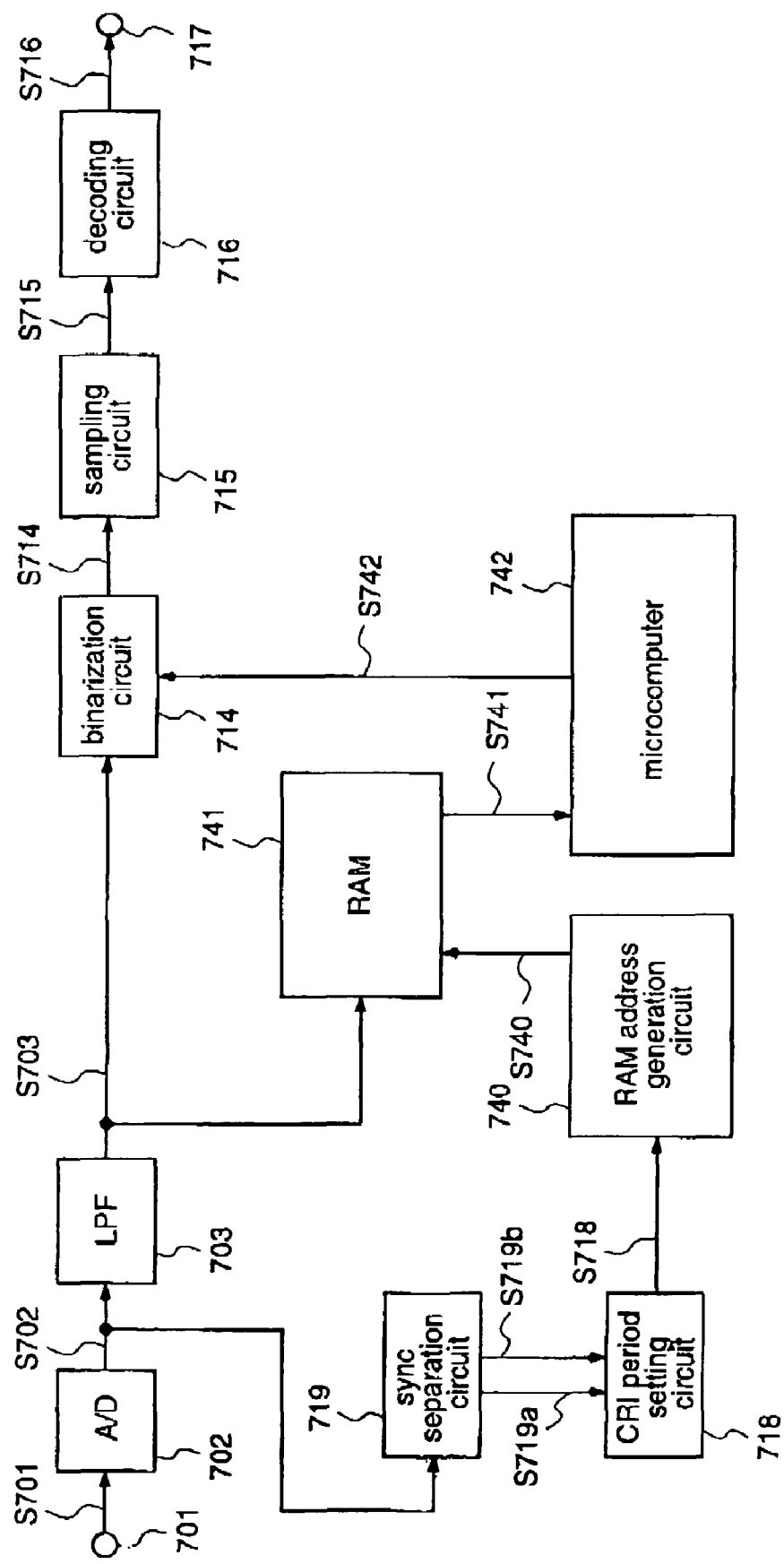
FIG. 7 is a block diagram illustrating the construction of a device for implementing data slice control methods according to fifth, sixth, seventh, and eighth embodiments of the present invention.

Hereinafter, a data slice control method according to a fifth embodiment of the present invention will be described with reference to FIGS. 7 and 8. FIG. 7 is a block diagram illustrating the construction that realizes the data slice control method according to the fifth embodiment of the invention.

In FIG. 7, a video signal input terminal 701 receives an analog video signal S701 in which telecast data are superposed in a vertical blanking period.

An A/D converter 702 samples the analog video signal S701 at a predetermined sampling clock fs (MHz) to convert the analog video signal S701 into a digital video signal S702, and outputs the digital video signal S702 to a low-pass filter (LPF) 703.

The LPF 703 subjects the inputted digital video signal S702 to noise removal, and outputs the noise-removed digital video signal S703 to a RAM 741 and a binarization circuit 714.

A sync separation circuit 719 separates the inputted digital video signal S702 into a horizontal sync signal S719*a* and a vertical sync signal S719*b*, and outputs these signals to a CRI period setting circuit 718. The horizontal sync signal S719*a* and the vertical sync signal S719*b* are used for setting the position or the CRI period.

The CRI period setting circuit 718 generates a CRI period setting signal S718 for setting a CRI period of the telecast data that is superimposed on the digital video signal S702, on the basis of the vertical sync signal S719*b* and the horizontal sync signal S719*a*, and outputs the CRI period setting signal S718 to a RAM address generation circuit 740.

The RAM address generation circuit 740 generates RAM addresses S740 for writing the noise-removed digital video signal S703 into the RAM 741 during a period when the CRI period setting signal S718 is effective, and outputs the RAM addresses S740 to the RAM 741.

The RAM 741 stores the noise-removed digital video signal S703 on the basis of the RAM addresses obtained from the RAM address generation circuit 740.

A microcomputer 742 calculates an optimum slice level using the data which have been stored in the RAM 741 during only the period when the CRI period setting signal S718 is effective, and outputs the slice level to the binarization circuit 714 the binarization circuit 714 converts the noise-removed digital video signal S703 into a binarized signal S714 comprising 0 and 1 by the slice level S742, and outputs the binarized signal S714 to a sampling circuit 715.

The sampling circuit 715 samples the binarized signal S714 at predetermined sampling intervals according to the type of the telecast mode, and outputs the sampled data S715 to a decoding circuit 716.

The decoding circuit 716 converts the serial sampled data S715 into a parallel signal, and subjects the data S715 to a decoding process according to the type of the telecast, such as error detection, and then outputs the decoded data S716 through an output terminal 717 to the outside.

Hereinafter, the contents of processing by the microcomputer 742 shown in FIG. 7 will be described in detail with reference to a flowchart of FIG. 8.

Figure 8:
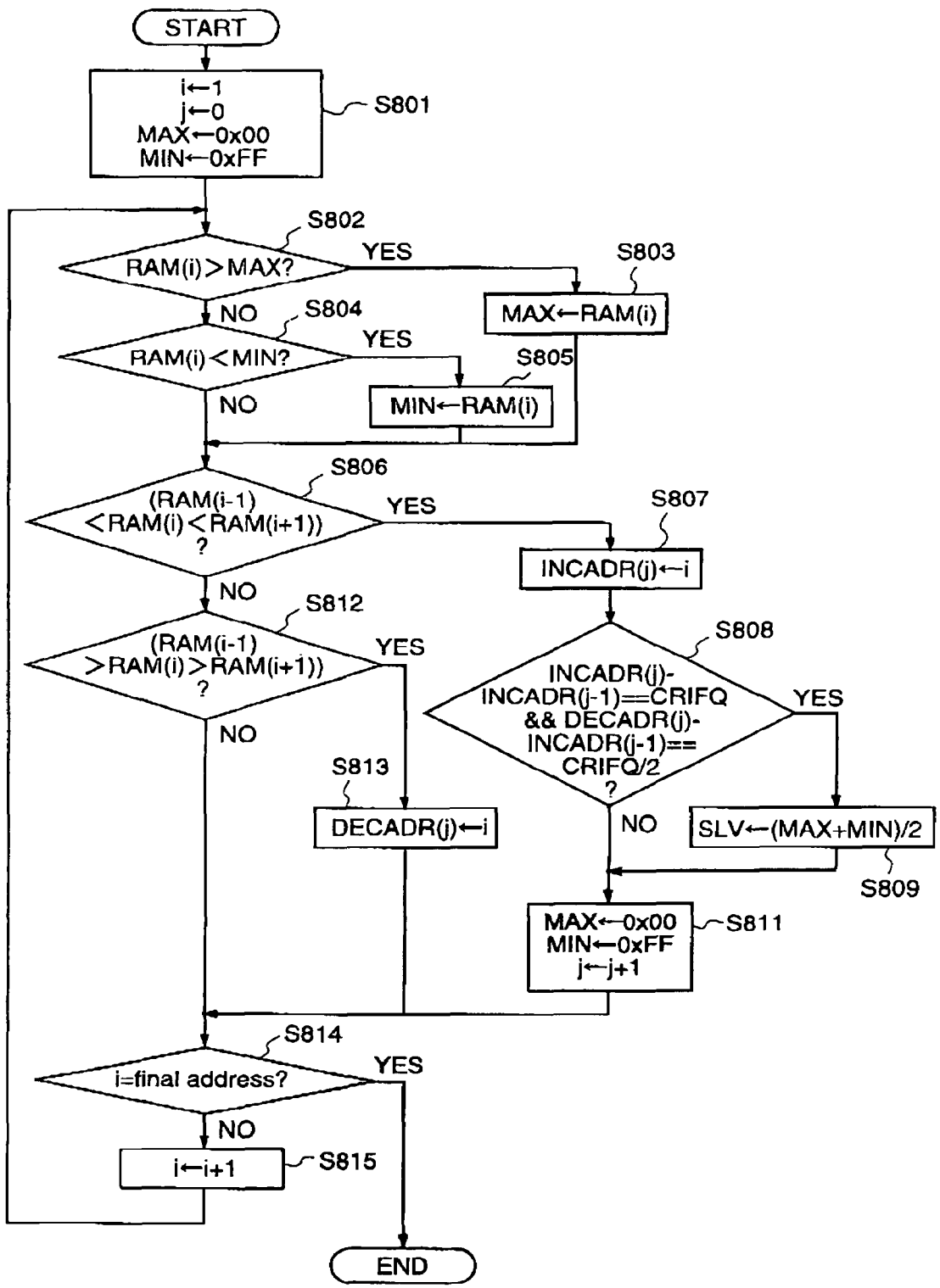
FIG. 8 is a flowchart illustrating process steps of the data slice control method according to the fifth embodiment.

With reference to FIG. 8, in step S801, an address i of the RAM 741, a variable j, a maximum value detection variable MAX, and a minimum value detection variable MIN are initialized, and the process goes to step S802.

In step S802, the RAM data RAM(i) stored in the address i is compared with the maximum value detection variable MAX, and the process goes to step S803 when the RAM data RAM(i) stored in the address i is larger than the maximum value detection variable MAX. Otherwise, the process goes to step S804.

In step S803, the maximum value detection variable MAX is changed to the RAM data RAM(i), and the process goes to step S806.

In step S804, the RAM data RAM(i) stored in the address i is compared with the minimum value detection variable MIN, and the process goes to step S805 when the RAM data RAM(i) stored in the address i is smaller than the minimum value detection variable MIN. Otherwise, the process goes to step S806

In step S805, the minimum value detection variable MIN is changed to the RAM data RAM(i), and the process goes to step S806.

In step S806, the RAM data RAM(i) stored in the current RAM address i, the RAM data RAM(i−1) stored in the RAM address i−1, and the RAM data RAM(i+1) stored in the RAM address i+1 are compared, and the process goes to step S807 when the sizes of these data, data values) are in the relationship of RAM(i−1)<RAM(i)<RAM(i+1). Otherwise, the process goes to step S812.

In step S807, the RAM address i is stored in a monotone increase detection address storage buffer INCADR(j), and the process goes to step S808.

In step S808, judgement of monotone increase is carried out using the address value stored in the monotone increase detection address storage buffer INCADR(j), the address value stored in a monotone increase detection address storage buffer INCADR(j−1), and CRI frequency data CRIFQ. The CRI frequency data CRIFQ can be obtained using the ratio between the sampling clock fs (MHz) and the transmission clock fchr (MHz) of the telecast data, i.e., it is calculated by 2fs/fchr. Initially, the RAM address j−1 that is stored in the immediately preceding monotone increase detection address storage buffet INCADR(j−1) is subtracted from the RAM address j that is stored in the current monotone increase detection address storage buffer INCADR(j), and it is checked whether the value is equal to the CRI frequency data CRIFQ or not. Next, the RAM address j−1 that is stored in the monotone increase detection address storage buffer INCADR(j−1) is subtracted from the RAM address j that is stored in the current monotone decrease detection address storage buffer DECADR(j), and it is checked whether the value is equal to ½ of the CRI frequency data CRIFQ or not. When the both conditions are satisfied, the process goes to step S809. Otherwise, the process goes to step S811.

In step S809, the slice level variable SLV is changed to the average of the maximum value detection variable MAX and the minimum value detection variable MIN, and the process goes to step S811.

In step S811, the maximum value detection variable. MAX and the minimum value detection variable MIN are initialized, and the variable j is incremented, and then the process goes to step S814.

In step S812, the RAM data RAM(i) stored in the current RAM address i, the RAM data RAM(i−1) stored in the RAM address i−1, and the RAM data RAM(i+1) stored in the RAM address i+1 are compared, and the process goes to step S813 when the sizes of these data (data values) are in the relationship of RAM(i+1)>RAM(i)>RAM(i−1). Otherwise, the process goes to step S814.

In step S813, the RAM address i is stored in the monotone decrease detection address storage buffer DECADR(j), and the process goes to step S814.

In step S814, it is checked whether the RAM address is a final address or not. When it is a final address, the process is ended. When it is not a final address, the process goes to step S815.

In step S815, the RAM address i is incremented, and the process returns to step S802.

The microcomputer 742 successively carries out steps S802 to S814 until the RAM address i becomes a final address.

The data slice control method according to the fifth embodiment provides the following effects. Since the telecast signal represented by a teletext signal is superimposed on the vertical blanking period of a television signal, the horizontal sync signal S719a separated by the sync separation circuit 719 is disturbed due to a macrovision signal of a copy guard signal or the like that is superimposed on the vertical blanking period. Therefore, it is considerably difficult to set the CRI period setting signal S718, which is generated with reference to the horizontal sync signal S719a, so as to include only the CRI period. Accordingly, in the data slice control method of the fifth embodiment, even when the horizontal sync signal S719a is disturbed, the range of the CRI period setting signal S718 is increased so as to include the CRI period, and the CRI is automatically detected within the period indicated by the CRI period setting signal, whereby more accurate slice level can be detected.

Furthermore, since the CRI detection is carried out on the basis of the type of the telecast mode and the frequency of the sampling clock, only the sampling clock should be determined to perform accurate calculation of slice levels corresponding to not only the teletext employed in Europe but also the VPS, WSS, multiplex telecast employed in Japan, electron programming guide (EPG), and closed caption employed in U.S.A., i.e., the data slice control device according to the fifth embodiment is adaptable to the telecast modes employed all over the world.

Embodiment 6

Figure 9:
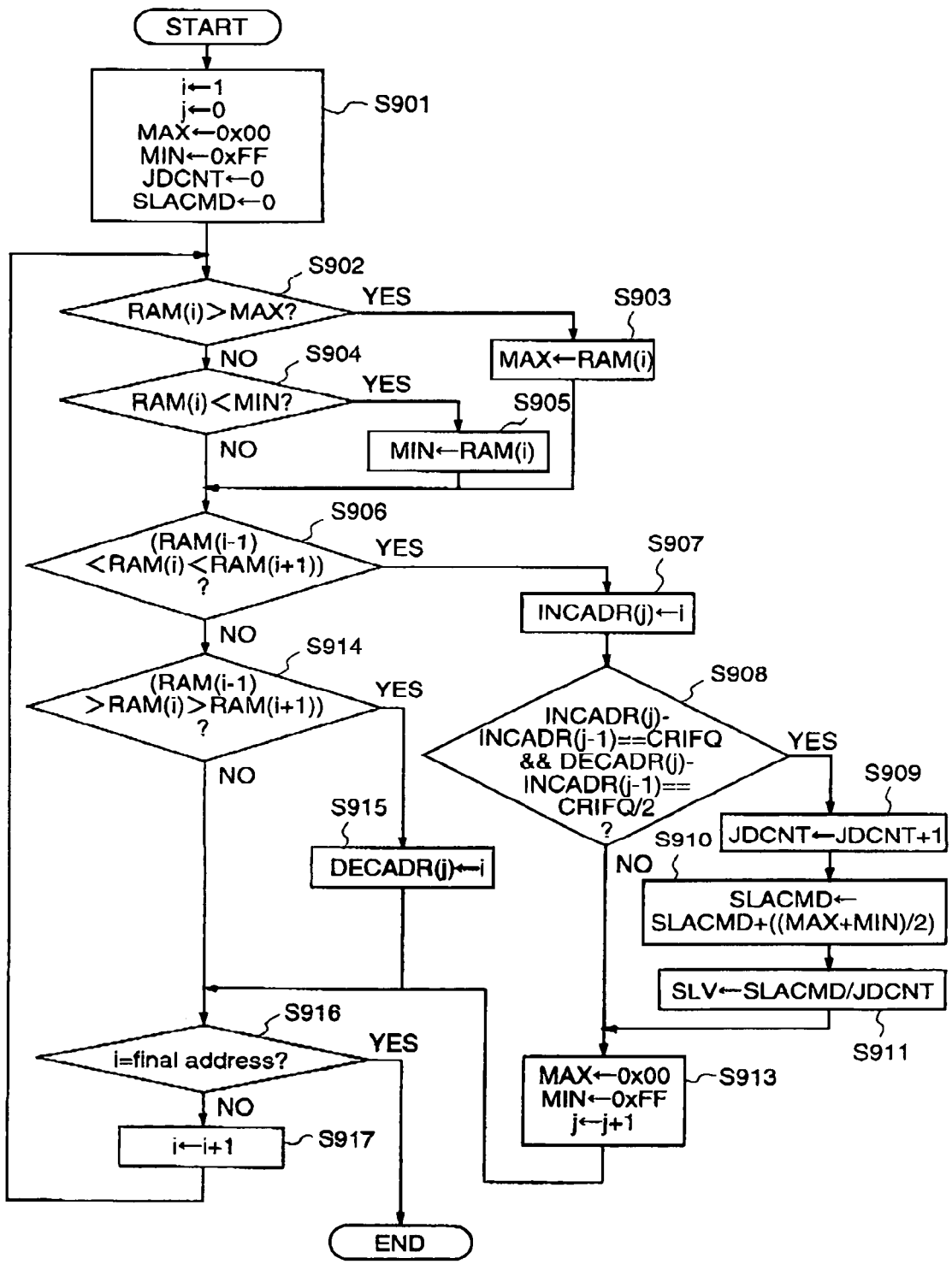
FIG. 9 is a flowchart illustrating process steps of the data slice control method according to the sixth embodiment.

Hereinafter, a data slice control method according to a sixth embodiment of the present invention will be described with reference to FIG. 9. FIG. 9 is a flowchart for explaining the contents of processing to be performed by the microcomputer 742 shown in FIG. 7. Since the processes other than those shown in FIG. 9 are identical to those described for the fifth embodiment, repeated description is not necessary.

With reference to FIG. 9, in step S901, the address i of the RAM 741, the variable j, the maximum value detection variable MAX, the minimum value detection variable MIN, the judgement result count variable JDCNT, and the slice level accumulation variable SLACMD are initialized, and the process goes to step S902.

In step S902, the RAM data RAM(i) stored in the address i is compared with the maximum value detection variable MAX, and the process goes to step S903 when the RAM data RAM(i) stored in the address i is larger than the maximum value detection variable MAX. Otherwise, the process goes to step S904.

In step S903, the maximum value detection variable MAX is changed to the RAM data RAM(i), and the process goes to step S906.

In step S904, the RAM data RAM(i) stored in the address i is compared with the minimum value detection variable MIN, and the process goes to step S905 when the RAM data RAM(i) stored in the address i is smaller than the minimum value detection variable MIN. Otherwise, the process goes to step S906.

In step S905, the minimum value detection variable MIN is changed to the RAM data RAM(i), and the process goes to step S906.

In step S906, the RAM data RAM(i) stored in the current RAM address i, the RAM data RAM(i−1) stored in the RAM address i−1, and the RAM data RAM(i+1) stored in the RAM address i+1 are compared, and the process goes to step S907 when the sizes of these data (data values) are in the relationship of RAM(i−1)<RAM(i)<RAM(i+1). Otherwise, the process goes to step S914.

In step S907, the RAM address i is stored in the monotone increase detection address storage buffer INCADR(j), and the process goes to step S908.

In step S908, judgement of monotone increase is carried out using the address value stored in the monotone increase detection address storage buffer INCADR(j), the address value stored in the immediately preceding monotone increase detection address storage buffer INCADR(j−1), and the CRI frequency data CRIFQ. The CRI frequency data CRIFQ can be obtained using the ratio between the sampling clock fs(MHz) and the transmission clock fchr(MHz) of the telecast data, i.e., it is calculated by 2fs/fchr. Initially, the RAM address j−1 that is stored in the immediately preceding monotone increase detection address storage buffer INCADR(j−1) is subtracted from the RAM address j that is stored in the current monotone increase detection address storage buffer INCADR(j), and it is checked whether the value is equal to the CRI frequency data CRIFQ or not. Next, the RAM address j−1 that is stored in the monotone increase detection address storage buffer INCADR(j−1) is subtracted from the RAM address j that is stored in the current monotone decrease detection address storage buffer DECADR(j), and it is checked whether the value is equal to ½ or the CRI frequency data CRIFQ or not. When the both conditions are satisfied, the process goes to step S909. Otherwise, the process goes to step S913.

In step S909, the judgement result count variable JDCNT is incremented, and the process goes to step S910.

In step S910, the slice level accumulation variable SLACMD is changed to a value that is obtained by adding the average of the maximum value detection variable MAX and the minimum value detection variable MIN to the slice level accumulation variable SLACMD, and the process goes to step S911.

In step S911, the slice level variable SLV is changed to a value that is obtained by dividing the slice level accumulation variable SLACMD by the judgement result count variable. JDCNT, and the process goes to step S913.

In step S913, the maximum value detection variable MAX and the minimum value detection variable MIN are initialized, and the variable j is incremented, and the process goes to step S916.

In step S914, the RAM data RAM(i) stored in the current RAM address i, the RAM data RAM(i−1) stored in the RAM address i−1, and the RAM data RAM(i+1) stored in the RAM address i+1 are compared, and the process goes to step S915 when the sizes of these data (data values) are in the relationship of RAM(i+1)>RAM(i)>RAM(i−1). Otherwise, the process goes to step S916.

In step S915, the RAM address i is stored in the monotone decrease detection address storage buffer DECADR(j), and the process goes to step S916.

In step S916, it is checked whether the RAM address i is a final address or not. When it is a final address, the process is ended. When it is not a final address, the process goes to step S917.

In step S917, the RAM address i is incremented, and the process returns to step S902.

The microcomputer 742 successively carries out steps S902 to S916 until the RAM address i becomes a final address.

As described above, in the data slice control method according to the sixth embodiment, even when the signal is disturbed due to ghosts or noises during the CRI period or the framing code period and thereby the maximum value becomes larger or smaller than the usual maximum value, adverse effects of ghosts or noises can be minimized by calculating slice levels within the CRI period including the same frequency component, and taking the average of the slice levels, whereby a more accurate slice level can be calculated.

Further, like the data slice control device according to the fifth embodiment, even when the horizontal sync signal S719a is disturbed, an accurate slice level can be detected. Further, the data slice control method according to the sixth embodiment is adaptable to the telecast modes employed all over the world.

Embodiment 7

Figure 10:
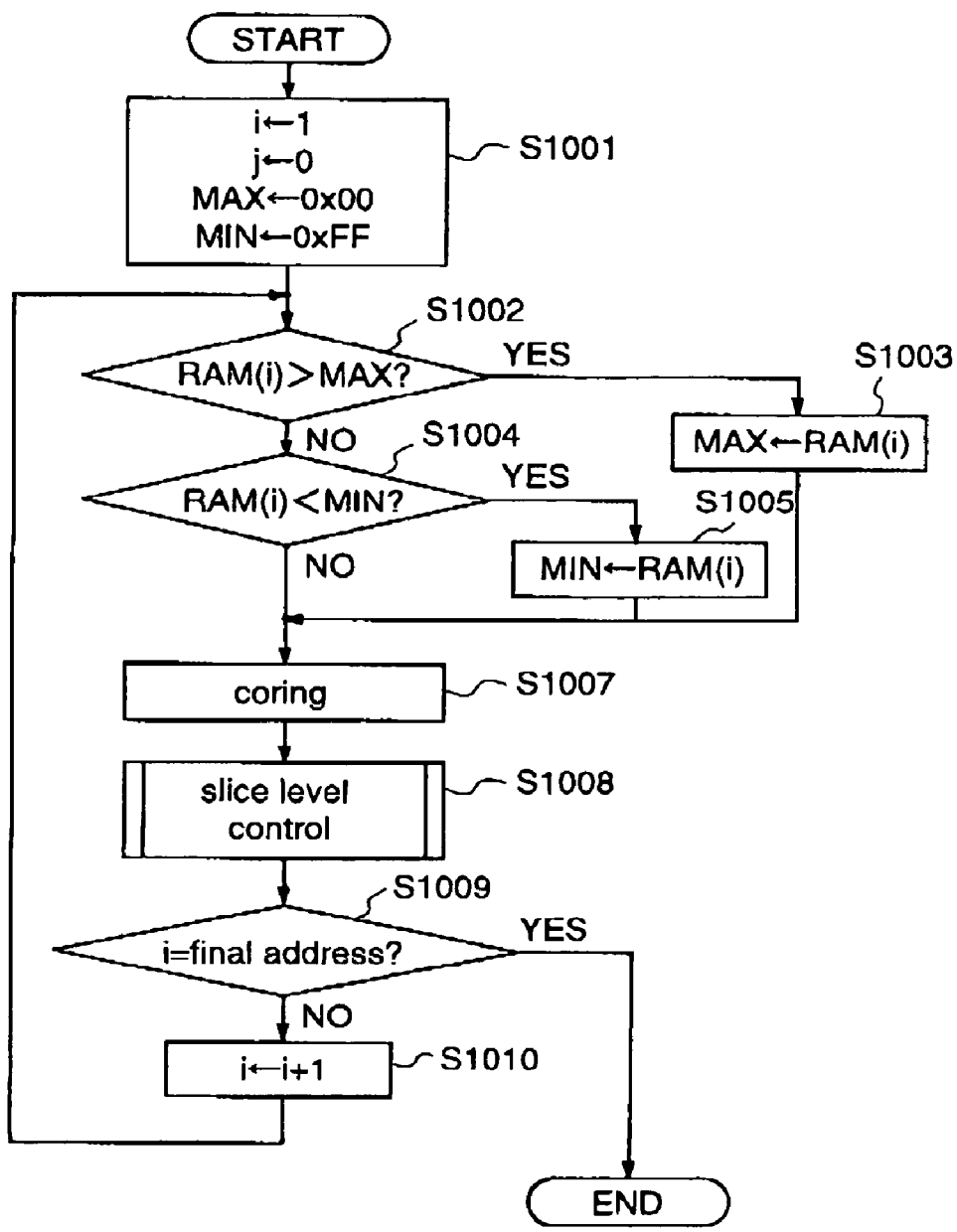
FIG. 10 is a flowchart illustrating process steps of the data slice control method according to the seventh embodiment.
Figure 11:
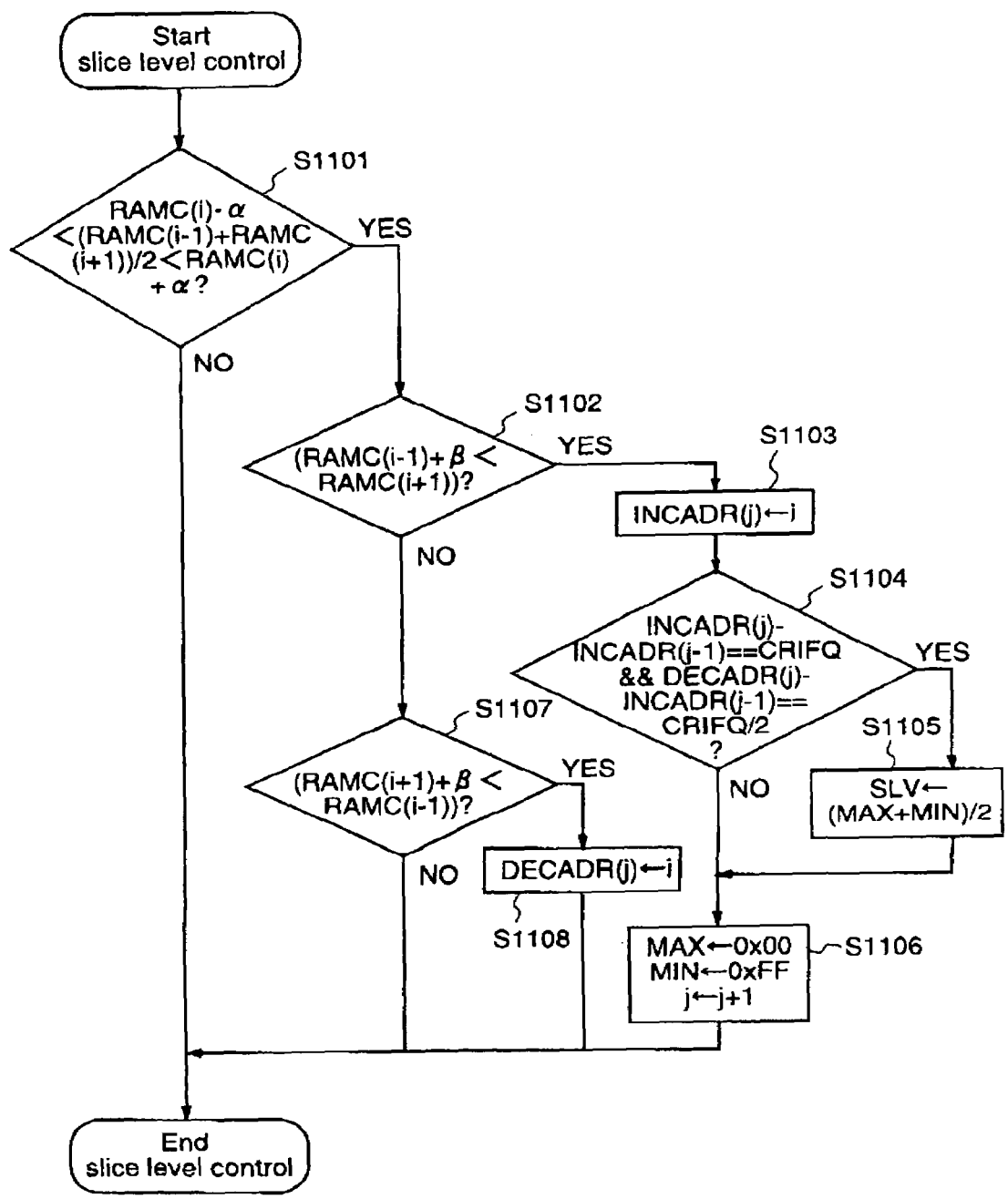
FIG. 11 is a flowchart illustrating the contents of a slice level control process that is one of the process steps of the data slice control method according to the seventh embodiment.

Hereinafter, a data slice control method according to a seventh embodiment of the present invention will be described with reference to FIGS. 10 and 11. FIG. 10 is a flowchart for explaining the contents of a process to be performed by the microcomputer 742 shown in FIG. 7. FIG. 11 is a flowchart for expressing the contents of a slice level control process in the flowchart of FIG. 10. Since the processes other than mentioned above are identical to those described for the fifth embodiment, repeated description is not necessary.

With reference to FIG. 10, in step S1001, the address i of the RAM 741, the variable j, the maximum value detection variable MAX, and the minimum value detection variable MIN are initialized, and the process goes to step S1002.

In step S1002, the RAM data RAM(i) stored in the address i is compared with the maximum value detection variable MAX, and the process goes to step S1003 when the RAM data RAM(i) stored in the address i is larger than the maximum value detection variable MAX. Otherwise, the process goes to step S1004.

In step S1003, the maximum value detection variable MAX is changed to the RAM data RAM(i), and the process goes to step S1007.

In step S1004, the RAM data RAM(i) stored in the address i is compared with the minimum value detection variable MIN, and the process goes to step S1005 when the RAM data RAM(i) stored in the address i is smaller than the minimum value detection variable MIN. Otherwise, the process goes to step S1007.

In step S1005, the minimum value detection variable MIN is changed to the RAM data RAM(i), and the process goes to step S1007.

In step S1007, the RAM data RAM(i) stored in the current RAM address i is subjected to coring. The coring is a process in which 0 is output when the size (data value) of the RAM data RAM(i) stored in the current RAM address i is smaller than the coring level CORLMTD, and a value obtained by subtracting the coring level CORLMTD from the data value of the RAM data RAM(i) is stored as coring data RAMC(i) in the RAM when the size (data value) of the RAM data RAM(i) is larger than the coring level CORLMTD, and the process goes to step S1008.

In step S1008, the coring data is subjected to slice level control, and the process goes to step S1009. The slice level control will be described later.

In step S1009, it is checked whether the RAM address i is a final address or not. When it is a final address, the process is ended. When it is not a final address, the process goes to step S1010.

In step S1010, the RAM address i is incremented, and the process returns to step S1002.

The microcomputer 742 successively carries out steps S1002 to S1009 until the RAM address i becomes a final address.

Hereinafter, the slice level control in step S1008 will be described in detail with reference to FIG. 11.

In step S1101, a value obtained by subtracting a threshold value α from the coring-processed data RAMC(i) that is stored in the RAM address i, the average of the coring-processed data RAMC(i−1) stored in the RAM address i−1 and the coring-processed data RAM(i+1) stored in the RAM address i+1, and a value obtained by adding the threshold value α to the RAMC(i−1) are compared, and the process goes to step S1102 when the sizes of these data (data values)

are in the relationship of RAMC (i)−α<(RAMC (i−1)+ RAMC(i+1))/2<RAMC(i)+α. Otherwise, the slice level control is ended.

In step S1102, a value obtained by adding a threshold value β to the coring-processed data RAMC(i−1) stored in the RAM address i−1 is compared with the coring-processed data RAMC(i+1) stored in the RAM address i+1, and the process goes to step S1103 when the RAMC(i+1) is larger than the RAMC(i−1)+β. Otherwise, the process goes to step S1107.

In step S1103, the RAM address i is stored in the monotone increase detection address storage buffer INCADR(j), and the process goes to step S1104.

In step S1104, judgement of CRI period is carried out using the address value stored in the monotone increase detection address storage buffer INCADR(j), the address value stored in the monotone increase detection address storage buffer INCADR(j−1), and the CRI frequency data CRIFQ. The CRI frequency data CRIFQ can be obtained using the ratio between the sampling clock fs(MHz) and the transmission clock fchr(MHz) of the telecast data, i.e., it is calculated by 2fs/fchr. Initially, the RAM address j−1 that is stored in the immediately preceding monotone increase detection address storage buffer INCADR(j−1) is subtracted from the RAM address j that is stored in the current monotone increase detection address storage buffer INCADR(j), and it is checked whether the value is equal to the CRI frequency data CRIFQ or not. Next, the RAM address j−1 that is stored in the monotone increase detection address storage buffer INCADR(j−1) is subtracted from the RAM address j that is stored in the current monotone decrease detection address storage buffer DECADR(j), and it is checked whether the value is equal to ½ of the CRI frequency data CRIFQ or not. When the both conditions are satisfied, the process goes to step S1105. Otherwise, the process goes to step S1106.

In step S1105, the slice level variable SLV is changed to the average of the maximum value detection variable MAX and the minimum value detection variable MIN, and the process goes to step S1106.

In step S1106, the maximum value detection variable MAX and the minimum value detection variable MIN are initialized, and the variable j is incremented, and then the slice level control process is ended.

In step S1107, the value obtained by adding the threshold value β to the coring-processed data RAMC(i+1) stored in the RAM address i+1 is compared with the coring-processed data RAMC(i−1) stored in the RAM address i−1, and the process goes to step S1108 when the RAMC(i−1) is larger than the RAMC(i+1)+β. Otherwise, the slice level control process is ended.

In step S1108, the RAM address i is stored in the monotone decrease detection address storage buffer DECADR (j), and the slice level control process is ended.

As described above, the data control method according to the seventh embodiment provides the following effects. When the data superimposed on the video signal is telecast data, the telecast data exists at a level higher than the pedestal level of the video signal. Therefore, it is possible to reduce adverse effects of noises lower than the pedestal level, by performing coring. Further, in this seventh embodiment, monotone increase detection and monotone decrease detection are carried out at the continuous three sampling points, and furthermore, inclinations of monotone increase and monotone decrease are calculated and judged. Therefore, it is possible to perform more accurate monotone increase detection and monotone decrease detection while minimizing adverse effects of noises or the like. As a result, a slice level to be calculated in the subsequent stage becomes to have higher accuracy.

Further, like the data slice control device according to the fifth embodiment, even when the horizontal sync signal S719a is disturbed, an accurate slice level can be detected. Further, the data slice control method according to the seventh embodiment is adaptable to the telecast modes employed all over the world.

Embodiment 8

Figure 12:
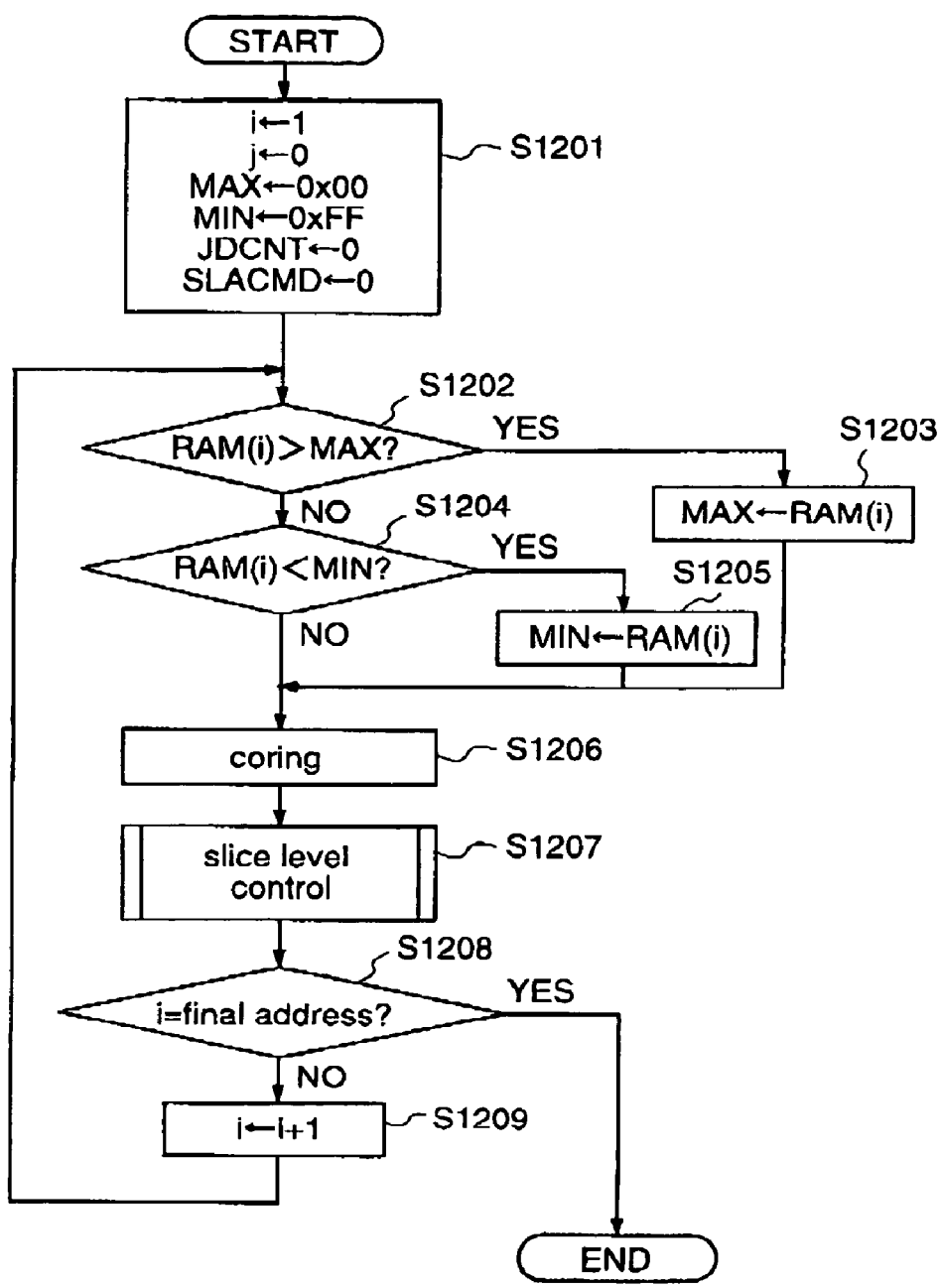
FIG. 12 is a flowchart illustrating process steps of the data slice control method according to the eighth embodiment.
Figure 13:
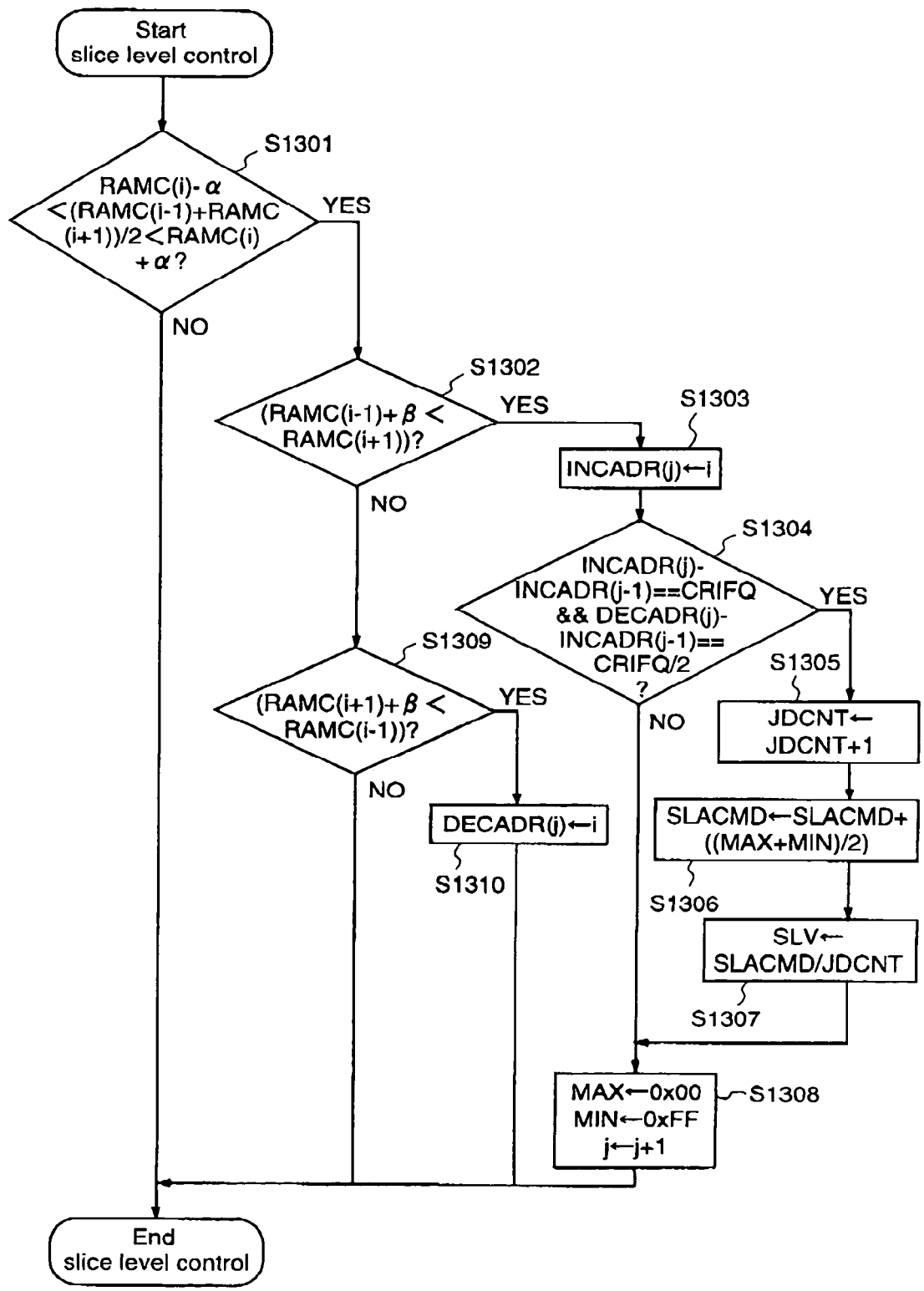
FIG. 13 is a flowchart illustrating the contents of a slice level control process that is one of the process steps of the data slice control method according to the eighth embodiment.
Figure 14:
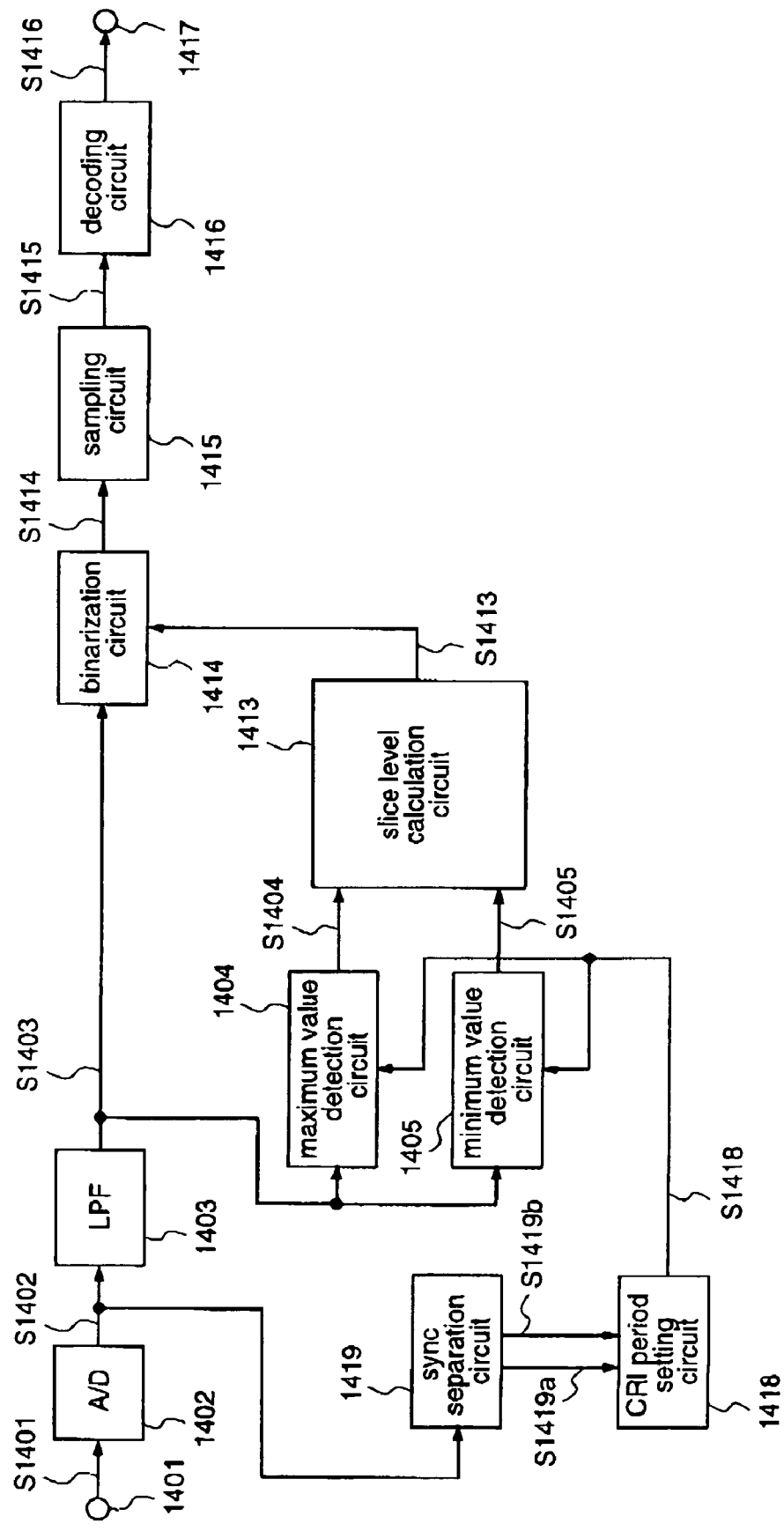
FIG. 14 is a block diagram illustrating the construction of a conventional data slice control device.

Hereinafter, a data slice control method according to an eighth embodiment of the present invention will be described with reference to FIGS. 12 and 13. FIG. 12 is a flowchart for explaining the contents of a process performed by the microcomputer 742 shown in FIG. 7, and FIG. 12 is a flowchart for explaining the contents of a slice level control process in the flowchart shown in FIG. 13. Since the processes other than mentioned above are identical to those described for the fifth embodiment, repeated description is not necessary.

With reference to FIG. 12, in step S1201, the address i of the RAM 741, the variable j, the maximum value detection variable MAX, the minimum value detection variable MIN, the judgement result count variable JDCNT, and the slice level accumulation variable SLACMD are initialized, and the process goes to step S1202.

In step S1202, the RAM data RAM(i) stored in the address i is compared with the maximum value detection variable MAX, and the process goes to step S1203 when the RAM data RAM(i) stored in the address i is larger than the maximum value detection variable MAX. Otherwise, the process goes to step S1204.

In step S1203, the maximum value detection variable MAX is changed to the RAM data RAM(i), and the process goes to step S1206.

In step S1204, the RAM data RAM(i) stored in the address i is compared with the minimum value detection variable MIN, and the process goes to step S1205 when the RAM data RAM(i) stored in the address i is smaller than the minimum value detection variable MIN. Otherwise, the process goes to step S1206.

In step S1205, the minimum value detection variable MIN is changed to the RAM data RAM(i), and the process goes to step S1206.

In step S1206, the RAM data RAM(i) stored in the current RAM address i is subjected to coring. The coring is a process in which 0 is output when the size (data value) of the RAM data RAM(i) stored in the current RAM address i is smaller than the coring level CORLMTD, and a value obtained by subtracting the coring level CORLMTD from the data value of the RAM data RAM(i) is stored as coring data RAMC(i) in the RAM when the size (data value) of the RAM data RAM(i) is larger than the coring level CORLMTD, and the process goes to step S1207.

In step S1207, the coring data is subjected to slice level control, and the process goes to step S1208. The slice level control will be described later.

In step S1208, it is checked whether the RAM address i is a final address or not. When it is a final address, the process is ended. When it is not a final address, the process goes to step S1209.

In step S1209, the RAM address i is incremented, and the process returns to step S1202.

The microcomputer 742 successively carries out steps S1202 to S1208 until the RAM address i becomes a final address.

Hereinafter, the slice level control in step S1207 will be described in detail with reference to FIG. 13.

In step S1301, a value obtained by subtracting a threshold value α from the coring-processed data RAMC(i) that is stored in the RAM address i, the average of the coring-processed data RAMC(i−1) stored in the RAM address i−1 and the coring-processed data RAM(i+1) stored in the RAM address i+1, and a value obtained by adding the threshold value a to the RAMC(i−1) are compared, and the process goes to step S1302 when the sizes of these data (data values) are in the relationship of RAMC(i)−α<(RAMC(i−1)+RAMC(i+1))/2<RAMC(i)+α. Otherwise, the slice level control is ended.

In step S1302, a value obtained by adding a threshold value β to the coring-processed data RAMC(i−1) stored in the RAM address i−1 is compared with the coring-processed data RAMC(i+1) stored in the RAM address i+1, and the process goes to step S1303 when the RAMC(i+1) is larger than the RAMC(i−1)÷β. Otherwise, the process goes to step S1309.

In step S1303, the RAM address i is stored in the monotone increase detection address storage buffer INCADR(j), and the process goes to step S1304.

In step S1304, judgement of CRI period is carried out using the address value stored in the monotone increase detection address storage buffer INCADR(j), the address value stored in the immediately preceding monotone increase detection address storage buffer INCADR(j−1), and the CRI frequency data CRIFQ. The CRI frequency data CRIFQ can be obtained using the ratio between the sampling clock fs(MHz) and the transmission clock fchr(MHz) of the telecast data, i.e., it is calculated by 2fs/fchr. Initially, the RAM address j−1 that is stored in the immediately preceding monotone increase detection address storage buffer INCADR(j−1) is subtracted from the RAM address j that is stored in the current monotone increase detection address storage buffer INCADR(j), and it is checked whether the value is equal to the CRI frequency data CRIFQ or not. Next, the RAM address j−1 that is stored in the monotone increase detection address storage buffer INCADR(j−1) is subtracted from the RAM address j that is stored in the current monotone decrease detection address storage buffer DECADR(j), and it is checked whether the value is equal to ½ of the CRI frequency data CRIFQ or not. When the both conditions are satisfied, the process goes to step S1305. Otherwise, the process goes to step S1308.

In step S1305, the judgement result count variable JDCNT is incremented, and the process goes to step S1306.

In step S1306, the slice level accumulation variable SLACMD is changed to a value that is obtained by adding the average of the maximum value detection variable MAX and the minimum value detection variable MIN to the slice level accumulation variable SLACMD, and the process goes to step S1307.

In stop S1307, the slice level variable SLV is changed to a value that is obtained by dividing the slice level accumulation variable SLACMD by the judgement result count variable JDCNT, and the process goes to step S1308.

In step S1308, the maximum value detection variable MAX and the minimum value detection variable MIN are initialized, and the variable j is incremented, and then the slice level control process is ended.

In step S1309, assuming that the threshold value is β, the value obtained by adding the threshold value β to the coring-processed data RAMC(i+1) stored in the RAM address i+1 is compared with the coring-processed data RAMC(i−1) stored in the RAM address i−1, and the process goes to step S1310 when the RAMC(i−1) is larger than the RAMC(i+1)+β. Otherwise, the slice level control process is ended.

In step S1310, the RAM address i is stored in the monotone decrease detection address storage buffer DECADR(j), and the slice level control process is ended.

As described above, the data control method according to the eighth embodiment provides the following effects. When the data superimposed on the video signal is telecast data, the telecast data exists at a level higher than the pedestal level of the video signal. Therefore, it is possible to reduce adverse effects of noises lower than the pedestal level, by performing coring. Further, in this seventh embodiment, monotone increase detection and monotone decrease detection are carried out at the continuous three sampling points, and furthermore, inclinations of monotone increase and monotone decrease are calculated and judged. Therefore, it is possible to perform more accurate monotone increase detection and monotone decrease detection while minimizing adverse effects of noises or the like. As a result, a slice level to be calculated in the subsequent stage becomes to have higher accuracy. Furthermore, even when the signal is disturbed due to ghosts or noises and thereby the maximum value becomes larger or smaller than the usual maximum value during the CRI period or the framing code period, it is possible to obtain an accurate slice level while reducing adverse effects of ghosts or noises, by calculating slice levels only in the CRI period including the same frequency component, and averaging the slice levels.

Further, like the data slice control device according to the fifth embodiment, even when the horizontal sync signal S719a is disturbed, an accurate slice level can be detected. Further, the data slice control method according to the eighth embodiment is adaptable to the telecast modes employed all over the world.

While in the fifth to eighth embodiments monotone increase detection and monotone decrease detection are carried out at three sampling points, monotone increase detection and monotone decrease detection may be carried out at more than three sampling points with the same effects as mentioned above.

Furthermore, the processes that have been described using the flowcharts of FIGS. 8 to 13 may be programmed, and the program may be executed by the microcomputer 742.

What is claimed is:

1. A data slice control device comprising:
   an A/D converter for sampling a data signal transmitted in serial, with a sampling clock of a predetermined frequency, thereby converting the data signal into digital data;
   a period setting circuit for setting a predetermined period of the data signal;
   a monotone increase detection circuit for detecting a monotone increase detection point indicating that amplitude values of sampling points of the digital data continuously increase within the period that is set by the period setting circuit;
   a monotone decrease detection circuit for detecting a monotone decrease detection point indicating that amplitude values of sampling points of the digital data continuously decrease within the period that is set by the period setting circuit;
   a counter for performing counting with the sampling clock during the period that is set by the period setting circuit, while resetting the count at a timing when the monotone increase detection circuit detects the monotone increase detection point;

a data holding circuit for holding count data obtained from the counter, at a timing when the monotone decrease detection circuit detects a monotone decrease detection point;

a period determination circuit for determining whether the data signal is within the predetermined period or not, on the basis of the monotone increase detection point obtained from the monotone increase detection circuit, the count data obtained from the counter, and the data held by the data holding circuit;

a maximum value detection circuit for detecting a maximum value of the amplitude values of the digital data within the period during which the monotone increase detection circuit detects the monotone increase points;

a minimum value detection circuit for detecting a minimum value of the amplitude values of the digital data within the period during which the monotone increase detection circuit detects the monotone increase points; and a slice level calculation circuit for calculating a slice level on the basis of the maximum value obtained from the maximum value detection circuit, the minimum value obtained from the minimum value detection circuit, and a result of determination obtained from the period determination circuit.

2. A data slice control device as defined in claim 1 further comprising:

a determination result counter for counting the result of determination obtained from the period determination circuit;

an accumulation circuit for accumulating the slice levels obtained from the slice level calculation circuit; and a data selection circuit for selecting a slice level on the basis of the accumulated data obtained from the accumulation circuit, and the determination result count data obtained from the determination result counter.

3. A data slice control device as defined in claim 1, wherein the data signal transmitted in serial is a telecast signal that is superimposed in a vertical blanking period of a video signal and transferred.

4. A data slice control device as defined in claim 1, wherein said period setting circuit sets a transmission clock synchronization period in which the transmission clock of the data signal is synchronized with the sampling clock.

5. A data slice control device comprising:

an A/D converter for sampling a data signal transmitted in serial, with a sampling clock of a predetermined frequency, thereby converting the data signal into digital data;

a period setting circuit for setting a predetermined period of the data signal;

a coring circuit for subjecting the digital data to a coring process;

a first masking circuit for subjecting coring data, which is obtained from the coring circuit within the period set by the period setting circuit, to a masking process;

a first delay unit for delaying the masking-processed coring data obtained from the first masking circuit, by one sampling clock;

a second delay unit for delaying the delayed data obtained from the first delay unit, by another one sampling clock;

an operation unit for arithmetically processing the masking-processed coring data obtained from the first masking circuit, and the delayed data obtained from the second delay unit;

a shifting operation circuit for subjecting operation result data obtained from the operation unit to a shift operation process;

a determination unit for detecting a point indicating that amplitude values of sampling points of the digital data continuously increase and a point indicating that amplitude values of sampling points of the digital data continuously decrease, on the basis of the masking-processed coring data obtained from the first masking circuit, and the delayed data obtained from the second delay unit, and outputting a monotone increase point detection signal and a monotone decrease point detection signal, respectively;

a comparator for comparing the delayed data obtained from the first delay unit with the shifting operation result data obtained from the shifting operation unit;

a second masking circuit for subjecting the monotone increase point detection signal obtained from the determination unit to a masking process on the basis of a result of comparison obtained from the comparator;

a third masking circuit for subjecting the monotone decrease point detection signal obtained from the determination unit to a masking process on the basis of the result of comparison obtained from the comparator;

a counter for performing counting with the sampling clock during the period that is set by the period setting circuit, while resetting the count at a timing when the second masking circuit outputs a monotone increase detection signal;

a data holding circuit for holding count data outputted from the counter, at the timing when the third masking circuit outputs a monotone decrease detection signal;

a period determination circuit for determining whether the data signal is within the predetermined period or not, on the basis of the monotone increase detection signal obtained from the second masking circuit, the count data obtained from the counter, and the data held by the data holding circuit;

a maximum value detection circuit for detecting a maximum value of the amplitude values of the digital data within the period during which the monotone increase points indicated by the monotone increase detection signal obtained from the second masking circuit are detected;

a minimum value detection circuit for detecting a minimum value of the amplitude values of the digital data within the period during which the monotone decrease points indicated by the monotone decrease detection signal obtained from the third masking circuit are detected; and a slice level calculation circuit for calculating a slice level on the basis of the maximum value obtained from the maximum value detection circuit, the minimum value obtained from the minimum value detection circuit, and a result of determination obtained from the period determination circuit.

6. A data slice control device as defined in claim 5 further comprising:

a determination result counter for counting the result of determination obtained from the period determination circuit;

an accumulation circuit for accumulating the slice levels obtained from the slice level calculation circuit; and a data selection circuit for selecting a slice level on the basis of the accumulated data obtained from the accumulation circuit, and the determination result count data obtained from the determination result counter.

7. A data slice control device as defined in claim 5, wherein said data signal transmitted in serial is a telecast signal that is superimposed in a vertical blanking period of a video signal, and transmitted.

8. A data slice control device as defined in claim 5, wherein said period setting circuit sets a transmission clock synchronization period in which the transmission clock of the data signal is synchronized with the sampling clock.

9. A data slice control method comprising:
   an A/D conversion step of sampling a data signal transmitted in serial, with a sampling clock of a predetermined frequency, thereby converting the data signal into digital data;
   a period setting step of setting a predetermined period of the data signal;
   a data storage step of storing the digital data within the period that is set in the period setting step;
   an address generation step of generating storage addresses of the digital data that is stored in the data storage step;
   a maximum value detection step of detecting a maximum value of the amplitude values of the digital data stored in the data storage step;
   a minimum value detection step of detecting a minimum value of the amplitude values of the digital data stored in the data storage step;
   a monotone increase point address detection step of detecting a storage address of a monotone increase point indicating that the amplitude values of the sampling points of the digital data stored in the data storage step continuously increase;
   a monotone decrease point address detection step of detecting a storage address of a monotone decrease point indicating that the amplitude values of the sampling points of the digital data stored in the data storage step continuously decrease;
   a determination step of determining whether the digital data corresponding to the monotone increase point address is a monotone increase point or not, on the basis of the monotone increase point address detected in the monotone increase point detection step, a monotone increase point address that is detected by one sampling clock before the monotone increase point address, and the monotone decrease point address detected in the monotone decrease point detection step; and
   a slice level calculation step of calculating a slice level from the maximum value obtained in the maximum value detection step and the minimum value obtained in the minimum value detection step, on the basis of a result of determination obtained from the determination step.

10. A data slice control method as defined in claim 9 further comprising:
   a determination result counting step of counting the result of determination obtained in the determination step;
   an accumulation step of accumulating the slice levels obtained in the slice level calculation step; and
   a slice level operation step of arithmetically processing the slice levels on the basis of the accumulated data obtained in the accumulation step, and the determination result count data obtained in the determination result counting step.

11. A data slice control method as defined in claim 9, wherein said data signal transmitted in serial is a telecast signal that is superimposed in a vertical blanking period of a video signal and transmitted.

12. A data slice control method as defied in claim 9, wherein said period setting step is a step of setting a transmission clock synchronization period in which the transmission clock of the data signal is synchronized with the sampling clock.

13. A data slice control method comprising:
   an A/D conversion step of sampling a data signal transmitted in serial, with a sampling clock of a predetermined frequency, thereby converting the data signal into digital data;
   a period setting step of setting a predetermined period of the data signal;
   a data storage step of storing the digital data within the period that is set in the period setting step;
   an address generation step of generating storage addresses of the digital data that is stored in the data storage step;
   a maximum value detection step of detecting a maximum value of the amplitude values of the digital data stored in the data storage step;
   a minimum value detection step of detecting a minimum value of the amplitude values of the digital data stored in the data storage step;
   a coring circuit of subjecting the digital data stored in the data storage step to a coring process;
   a comparison step of comparing the size of first data that is subjected to coring in the coring step, the size of second data that is subjected to coring by one sampling clock before the first data, and the size of third data that is subjected to coring by one sampling clock after the first data;
   a monotone increase point address storage step of storing the storage address of the first data as a monotone increase point address, when the result of comparison in the comparison step indicates that the data sizes of the first, second, and third data are in ascending order of the second data<the first data<the third data;
   a monotone decrease point address storage step of storing the storage address of the first data as a monotone decrease point address, when the result of comparison in the comparison step indicates that the data sizes of the first, second, and third data are in ascending order of the third data<the first data<the second data;
   a determination step of determining whether the digital data corresponding to the monotone increase point address is a monotone increase point or not, on the basis of the monotone increase point address stored in the monotone increase point address storage step, a monotone increase point address that is stored by one sampling clock before the monotone increase point address, and the monotone decrease point address stored in the monotone decrease point address storage step; and
   a slice level calculation step of calculating a slice level from the maximum value obtained in the maximum value detection step and the minimum value obtained in the minimum value detection step, on the basis of a result of determination obtained from the determination step.

14. A data slice control method as defined in claim 13 further comprising:
   a determination result counting step of counting the result of determination obtained in the determination step;

an accumulation step of accumulating the slice levels calculated in the slice level calculation step; and a slice level operation step of arithmetically processing the slice levels on the basis of the accumulated data obtained in the accumulation step, and the determination result count data obtained in the determination result counting step.

15. A data slice control method as defined in claim 13, wherein said data signal transmitted in serial is a telecast signal that is superimposed in a vertical blanking period of a video signal and transmitted.

16. A data slice control method as defied in claim 13, wherein said period setting step is a step of setting a transmission clock synchronization period in which the transmission clock of the data signal is synchronized with the sampling clock.

* * * * *